(12) United States Patent
Beguin et al.

(10) Patent No.: US 9,892,450 B2
(45) Date of Patent: Feb. 13, 2018

(54) DEVICE FOR DELIVERY SERVICE

(71) Applicant: Amazon Technologies, Inc., Reno, NV (US)

(72) Inventors: Julien George Beguin, San Francisco, CA (US); John Mathew Depew, Sunnyvale, CA (US); Richard David Young, Mission Viejo, CA (US); David George Butler, San Jose, CA (US); Thomas William Keen, Sunnyvale, CA (US); John Avery Howard, Palo Alto, CA (US); Thomas Bruno Mader, Los Gatos, CA (US); Toni Raquel Reid Thomelin, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 833 days.

(21) Appl. No.: 14/191,239

(22) Filed: Feb. 26, 2014

(65) Prior Publication Data
US 2015/0242933 A1    Aug. 27, 2015

(51) Int. Cl.
*G06Q 30/06* (2012.01)
*G06K 7/10* (2006.01)
*G06Q 50/10* (2012.01)

(52) U.S. Cl.
CPC ....... *G06Q 30/0633* (2013.01); *G06K 7/1091* (2013.01); *G06K 7/10881* (2013.01); *G06Q 50/10* (2013.01)

(58) Field of Classification Search
CPC .......................................... G06Q 30/06–30/08
(Continued)

(56) References Cited

U.S. PATENT DOCUMENTS 5,174,139 A * 12/1992 Huang ................... A44B 15/00
                                                                206/37.5
5,703,349 A    12/1997 Meyerson et al.
(Continued)

FOREIGN PATENT DOCUMENTS

EP    1016999    7/2000
EP    2693689    2/2014
(Continued)

OTHER PUBLICATIONS

Office action for U.S. Appl. No. 14/191,079, dated Mar. 16, 2016, Beguin et al., "Management of Handheld Electronic Device", 20 pages.
(Continued)

*Primary Examiner* — Ethan D Civan
*Assistant Examiner* — Ming Shui
(74) *Attorney, Agent, or Firm* — Lee & Hayes, PLLC

(57) ABSTRACT

In some cases, a handheld electronic device may operate in a voice input mode or a scanner input mode. When operating in the voice input mode, the handheld electronic device may record and store audio data in memory. In some cases, the stored audio data may be communicated from the handheld electronic device (e.g., via a Wi-Fi connection) to one or more remote computing devices (e.g., for speech processing). When operating in the scanner input mode, the handheld electronic device may record and store item identifier information (e.g., as barcode data) in the memory. In some cases, the stored item identifier data may be communicated to the one or more remote computing devices (e.g., for item identification processing).

27 Claims, 15 Drawing Sheets

(58) Field of Classification Search
USPC .................................................. 705/26.1–27.2
See application file for complete search history.

(56) References Cited

U.S. PATENT DOCUMENTS

| | | | |
|---|---|---|---|
| 5,936,622 | A | 8/1999 | Halverson et al. |
| 6,119,939 | A * | 9/2000 | Schwartz ............ G06K 7/10732 235/454 |
| 7,542,951 | B1 | 6/2009 | Chakrabarti et al. |
| 7,756,757 | B1 * | 7/2010 | Oakes, III ............ G06Q 10/047 705/26.1 |
| 8,538,829 | B1 | 9/2013 | Hu et al. |
| 8,770,484 | B2 | 7/2014 | Vanderhulst |
| 2002/0016189 | A1 | 2/2002 | Sheynblat et al. |
| 2003/0061526 | A1 * | 3/2003 | Hashimoto ............ G06F 1/3228 713/320 |
| 2003/0212465 | A1 | 11/2003 | Howard et al. |
| 2006/0236370 | A1 | 10/2006 | John et al. |
| 2007/0094096 | A1 | 4/2007 | Hellal et al. |
| 2008/0108349 | A1 | 5/2008 | Ihattula |
| 2008/0228600 | A1 * | 9/2008 | Treyz ..................... G06Q 20/12 705/26.43 |
| 2008/0235022 | A1 | 9/2008 | Bergl et al. |
| 2009/0098914 | A1 | 4/2009 | Martin-Cocher et al. |
| 2009/0124195 | A1 | 5/2009 | Kamijoh et al. |
| 2011/0177792 | A1 | 7/2011 | Bruno et al. |
| 2012/0067943 | A1 | 3/2012 | Saunders et al. |
| 2012/0150750 | A1 | 6/2012 | Law et al. |
| 2012/0158919 | A1 | 6/2012 | Aggarwal et al. |
| 2013/0018960 | A1 | 1/2013 | Knysz et al. |
| 2013/0301505 | A1 | 11/2013 | Ray et al. |
| 2014/0047524 | A1 | 2/2014 | Auger |
| 2014/0282924 | A1 | 9/2014 | Singhal |

FOREIGN PATENT DOCUMENTS

| | | |
|---|---|---|
| WO | WO2012135563 | 10/2010 |
| WO | WO2012172533 | 12/2012 |
| WO | WO2013067044 | 5/2013 |

OTHER PUBLICATIONS

Office action for U.S. Appl. No. 14/191,079, dated Jun. 28, 2016, Beguin et al., "Management of Handheld Electronic Device", 20 pages.

PCT Search Report and Written Opinion dated Jun. 10, 2015 for PCT application No. PCT/US2015/017378, 11 pages.

The PCT Search Report and Written Opinion dated Jun. 18, 2015 for PCT application No. PCT/US2015/017375, 12 pages.

PCT Search Report and Written Opinion dated May 13, 2015 for PCT Application No. PCT/US15/17384, 11 pages.

Bohn, "Hiku smartphone accessory seeks to Kickstart shopping lists with Evernote integration", retrieved at <<http://www.theverge.com/2012/9/25/3386562/hiku-smartphone-accessory-list-evernote>>, The Verge, Sep. 25, 2012, 5 pages.

Drell, "Smaller Than Your Phone, This Device Could Keep You Healthy", retrieved at <<http://mashable.com/2013/11/26/tellspec/#:eyJzljoiZilslmkiOiJfa3dtaHJyb2YwNG1manJvaCJ9>>, Mashable Inc., Nov. 26, 2013, 7 pages.

Office action for U.S. Appl. No. 14/191,079 dated Sep. 11, 2015, Beguin et al., "Management of Handheld Electronic Device", 13 pages.

CompactFlash Scan Card Series 5 User Manual, Socket Mobile, Newark, CA, US, Jul. 2012., 40 pages.

Office action for U.S. Appl. No. 14/191,079, dated Jan. 12, 2017, Beguin et al., "Management of Handheld Electronic Device", 20 pages.

Office action for U.S. Appl. No. 14/191,079, dated Nov. 22, 2016, Beguin et al., "Management of Handheld Electronic Device", 24 pages.

Office action for U.S. Appl. No. 14/191,271, dated Dec. 12, 2016, Butler et al., "Electronic Device Task Serialization", 12 pages.

Office action for U.S. Appl. No. 14/191,180, dated Apr. 20, 2017. Beguin et al., "Delivery Service System", 26 pages.

Office action for U.S. Appl. No. 14/191,271, dated Jul. 10, 2017, Butler et al., "Electronic Device Task Sterilization", 9 pages.

* cited by examiner

DEVICE FOR DELIVERY SERVICE

BACKGROUND

Keeping track of ongoing shopping needs may be challenging. For example, many families may find it difficult to organize requests from each family member. Further, shoppers may forget to purchase items and may only realize that they forgot to purchase certain items until after returning from a shopping trip.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure describes, in part, a handheld electronic device that allows a user to provide voice input and to scan an item identifier (e.g., a barcode on a product or product package). In some cases, the handheld electronic device may be used with a delivery service (e.g., a grocery delivery service). The handheld electronic device may communicate voice input and/or scanned identifier information (e.g., barcode data) to the delivery service for processing (e.g., adding a product to a virtual shopping cart).

Figure 1:
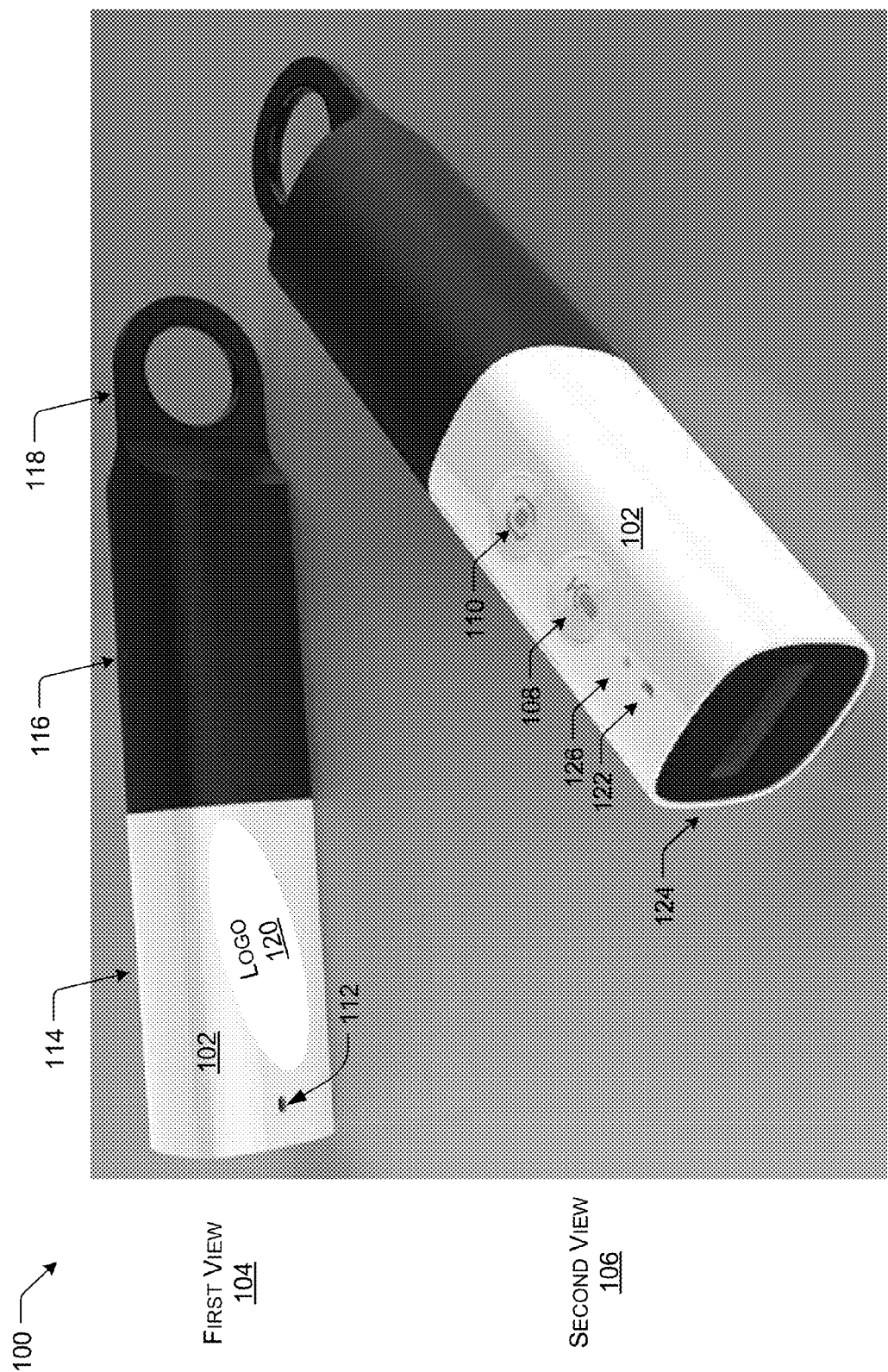
FIG. 1 illustrates an example handheld electronic device to receive voice and scanner input (e.g., for use with a delivery service), according to some implementations.

Referring to FIG. 1, two different views of an example handheld electronic device 102 (e.g., for use with a delivery service) are illustrated and generally designated 100. A first view 104 of the handheld electronic device 102 illustrates a "bottom" side of the handheld electronic device 102, while a second view 106 illustrates a "top" side of the handheld electronic device 102. As used herein, the term "top" side refers to a side of the handheld electronic device 102 that includes one or more user selectable controls (e.g., buttons), while the term "bottom" side refers to a side of the handheld electronic device 102 that is substantially opposite the "top" side. For example, the second view 106 illustrates that the top side of the handheld electronic device 102 includes a first user selectable control 108 and a second user selectable control 110. In the particular embodiment illustrated in FIG. 1, the first user selectable control 108 includes a first user actuatable button (e.g., identified by a microphone icon), and the second user selectable control 110 includes a second user actuatable button (e.g., identified by a scanner icon). Further, the first view 104 illustrates that the bottom side of the handheld electronic device 102 may include an opening or aperture associated with a speaker 112 that may provide audio feedback to a user.

The first view 104 illustrates that the handheld electronic device 102 may include a sleeve 114 and a handle 116. In some embodiments, the handheld electronic device 102 may include a housing (e.g., a combination of the sleeve 114 and the handle 116) with a first dimension substantially longer than a second dimension. For example, referring to FIG. 1, the first view 104 and the second view 106 illustrates that the handheld electronic device 102 has a first dimension (e.g., from the lens assembly 124 to an edge of the handle 116) that is substantially longer than a second dimension (e.g., one dimension of a face of the lens assembly 124). In the particular embodiment illustrated in FIG. 1, the face of the lens assembly 124 may have a substantially square shape. That is, both dimensions of the face of the lens assembly 124 may be substantially the same. Alternatively, one dimension may be substantially longer than another dimension. Thus, in the particular embodiment illustrated in FIG. 1, the handheld electronic device 102 includes a housing having a substantially cuboidal shape. That is, in the example of FIG. 1, the handheld electronic device 102 has a shape substantially corresponding to a convex polyhedron having six faces, eight vertices and twelve edges. However, in alternative embodiments, the housing may have another shape (e.g., a substantially cylindrical shape, among other alternatives).

In the example of FIG. 1, the handle 116 includes a substantially circular-shaped portion 118 (or another shape, such as a rectangle) that may allow the user to hang the handheld electronic device 102 from a hook for safe-keeping (e.g., in a kitchen or pantry area, among other alternatives). Further, in the particular example illustrated in FIG. 1, the first view 104 illustrates that the handheld electronic device 102 may include a logo 120 (e.g., a logo associated with a delivery service), which in some cases may be laser-etched onto the sleeve 114 for durability.

Figure 2:
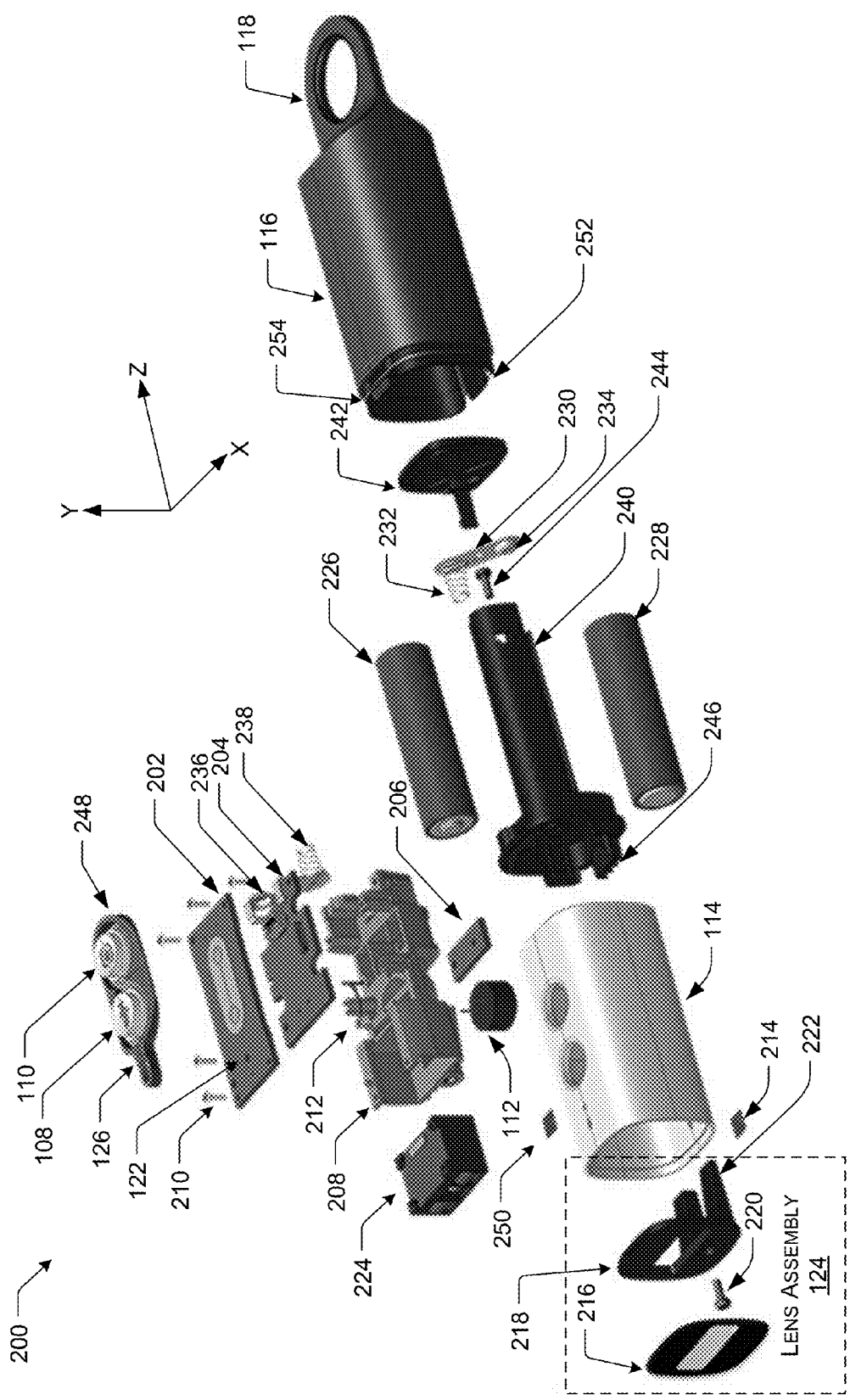
FIG. 2 illustrates an exploded view of select components of the example handheld electronic device of FIG. 1, according to some implementations.

The second view 106 further illustrates an opening or aperture in the sleeve 114 associated with a microphone 122 (or other audio input component) configured to receive a voice input from a user. In some cases, as shown in FIG. 2, the microphone 122 may disposed on the main PCB 202. In a particular embodiment, the microphone 122 may include an omni-directional digital microelectromechanical systems (MEMS) microphone. The user's near-field voice audio data may be captured via the microphone 122 (which may include a bottom port and an integrated interchip sound (I2S) digital output). In a particular embodiment, the microphone 122 may utilize a MEMS audio sensor, signal conditioning, an analog-to-digital converter, anti-aliasing filters, power management, and an I2S interface (e.g., a 24-bit I2S interface to the microcontroller 306 of the main PCB 202 illustrated in FIG. 3).

In a particular embodiment, the microphone 122 may have a frequency response parameter corresponding to a low to high frequency range with an average low frequency of about 60 Hz and an average high frequency of about 15,000 Hz. Further, the microphone 122 may have an accuracy parameter corresponding to a number of active bits with an average of about 24 bits and may have a signal to noise ratio (SNR) parameter with an average SNR of about 61 dBA.

In the second view 106, a lens assembly 124 may be associated with a scanner housed within the sleeve 114 (see e.g., the scanner 224 of FIG. 2). For example, the scanner may include a barcode scanner or other optical component, such as a camera. In a particular embodiment, the scanner includes a barcode scanner that may be capable of scanning various types of barcodes, including a Universal Product Code A (UPC-A) barcode, a UPC-E barcode, or European Article Number 13 (EAN-13) barcode, among other alternatives. In some cases, the scanner may allow a user to scan a quick response (QR) code, an radio-frequency identification (RFID) tag, a near-field communication (NFC) identifier, or other identifier.

The microphone 122 may be activated in response to user actuation of the first user selectable control 108, while the scanner may be activated in response to the user actuation of the second selectable control 110. The second view 106 also illustrates that the handheld electronic device 102 may include one or more light sources 126, such as light emitting diodes (LEDs), that may be illuminated to provide visual feedback to the user.

Referring to FIG. 2, an exploded view of select components of the example handheld electronic device 102 of FIG. 1 is illustrated and generally designated 200.

In the embodiment illustrated in FIG. 2, the handheld electronic device 102 includes a main PCB 202 and a power PCB 204. Particular components of the main PCB 202 are further illustrated in FIG. 3, while particular components of the power PCB 204 are further illustrated in FIG. 4. The handheld electronic device 102 also includes an antenna PCB 206 that may be disposed on an underside of a sleeve frame 208. In some cases, one or more screws 210 (e.g., five M1.4×5 screws) may be used to attach the main PCB 202 and the power PCB 204 to the sleeve frame 208. Further, in the example illustrated, an antenna cable 212 is disposed on a side of the sleeve frame 208 that is adjacent to the power PCB 204 and substantially opposite the antenna PCB 206. The antenna cable 212 is communicatively coupled to the antenna PCB 206 (e.g., via one or more electrical communication pathways disposed within the sleeve frame 208).

The handheld electronic device 102 also includes the speaker 112 (e.g., a "buzzer"), which may output audio via an opening on the underside of the sleeve 114 (see e.g., the first view 104 of FIG. 1). In some cases, an audio mesh 214 may be disposed within the sleeve 144 and substantially adjacent to the aperture associated with the speaker 112, in order to protect various components housed within the sleeve 114. In a particular embodiment, the speaker 112 may include a piezoelectric buzzer (e.g., 12.2 mm) under pulse-width modulation (PWM) control. In a particular embodiment, the speaker 112 may have a resonant frequency of about 4 KHz and may be capable of outputting sound from 60 to 75 decibels (dB) over a frequency range of 1,000 to 10,000 Hz, the equivalent of three octaves.

The handheld electronic device 102 further illustrates that the lens assembly 124 may include a lens 216 and a lens frame 218. In a particular embodiment, the lens 216 may be formed from a transparent thermoplastic, such as poly (methyl methacrylate) (PMMA), as a lightweight shatter-resistant alternative to glass. In some cases, the lens 216 may include a pressure sensitive adhesive (PSA) on a side adjacent to the lens frame 218 to attach the lens 216 to the lens frame 218. Further, in the example illustrated, at least one screw 220 (e.g., a single M2×6 screw) may be used to attach the lens 216 to the lens frame 218. The lens frame 218 may include multiple lens feet 222 (e.g., two lens feet) that may be wedge-shaped to couple the lens assembly 124 to the sleeve 114. In the example illustrated in FIG. 2, the lens frame 218 may provide the structural support to the handheld electronic device 102. As the lens 216 does not provide structural support, the lens 216 may not be stressed by an impact.

In the exploded view 200 of FIG. 2, a scanner 224 is shown above the sleeve 114, and the lens assembly 124 is shown to the left of the sleeve 114 for illustrative purposes only. After assembly, the scanner 224 is disposed within the sleeve 114 between the sleeve frame 208 and the lens assembly 124.

In some embodiments, at least one removable battery may be electrically connected to the power PCB 204. In the example illustrated in FIG. 2, a first battery 226 (e.g., a first replaceable AA size battery) and a second battery 228 (e.g., a second replaceable AA size battery) are shown. The handheld electronic device 102 may receive power from alternative numbers of batteries (e.g., a single battery or more than two batteries) and/or alternative sizes of batteries (e.g., AAA size). Further, alternative types of removable batteries, such as standard primary (single-use) or secondary (rechargeable) cells, may be used.

In the embodiment illustrated in FIG. 2, a battery contact cap 230 includes a first battery contact 232 (e.g., a conical spring battery contact) to contact a first terminal (e.g., a negative terminal) of the first battery 226. The battery contact cap 230 also includes a second battery contact 234 to contact a first terminal (e.g., a positive terminal) of the second battery 228. After assembly, the first battery 226 and the second battery 228 may be electrically connected to the power PCB 204. That is, a second terminal (e.g., a positive terminal) of the first battery 226 may be electrically connected to a first battery contact 236 of the power PCB 204. Further, a second terminal (e.g., a negative terminal) of the second battery 228 may be electrically connected to a second battery contact 238 (e.g., a conical spring battery contact) of the power PCB 204.

In some cases, the second terminal (e.g., the positive terminal) of the first battery 226 may be electrically connected to the first battery contact 236 of the power PCB 204 by direct physical contact. Alternatively, the first battery 226 may be electrically connected to the first battery contact 236 of the power PCB 204 at least in part via a conductive pathway disposed within a handle frame 240. Further, in some cases, the second terminal (e.g., the negative terminal) of the second battery 228 may be electrically connected to the second battery contact 238 of the power PCB 204 by direct physical contact. Alternatively, the second battery 228 may be electrically connected to the second battery contact 238 of the power PCB 204 at least in part via a conductive pathway disposed within the handle frame 240.

In the exploded view 200 of FIG. 2, the handle frame 240 is shown adjacent to the handle 116 and the sleeve 114 for illustrative purposes. A battery cap 242 may be attached to the handle frame 240 via at least one screw 244 (e.g., a single M2×6 screw), and the handle frame 240 may include one or more wedge-shaped feet 246 on a side adjacent to the sleeve 114. After assembly, at least a portion of the one or more wedge-shaped feet 246 may be disposed within the sleeve 114. When assembled, the wedge-shaped feet 246 of the handle frame 240 and the wedge-shaped lens feet 222 of the lens frame 218 may serve to "push" the components within the sleeve 114 towards the top side of the sleeve 114. To illustrate, in the example of FIG. 2, the first user selectable control 108 includes a first button identified by the microphone icon, and the second user selectable control 110 includes a second button identified by the scanner icon. The first button 108 and the second button 110 may be disposed on a button assembly 248 (e.g., a silicon button assembly). The wedge-shaped feet 246 of the handle frame 240 and the wedge-shaped lens feet 222 of the lens frame 218 may "push" the button assembly 248 towards the top side of the sleeve 114 to expose the first button 108 and the second button 110 via openings in the sleeve 114.

The button assembly 248 may be disposed adjacent to an opening in the sleeve 114 (see e.g., the second view 104 of FIG. 1) through which the microphone 122 may receive voice input. Further, in some cases, the button assembly 248 may also include an opening to provide an audio patch between the opening in the sleeve 114 and the microphone 112 of the main PCB 202. In some cases, an audio mesh 250 may be disposed within the sleeve 114 substantially adjacent to the aperture associated with the microphone 122, in order to protect various components housed within the sleeve 114. The button assembly 248 may include the one or more light sources 126 or may be disposed adjacent to the one or more light sources 126. As further described herein, at least one of the one or more light sources 126 may be illuminated to provide feedback to the user via an opening (e.g., a "light-pipe") in the sleeve 114 (see e.g., the second view 104 of FIG. 1).

Thus, FIG. 2 illustrates that the sleeve 114 may represent a primary enclosure that contains the main PCB 202, the power PCB 204, the antenna PCB 206, the speaker 112, and the button assembly 248. The sleeve frame 208 may be retained in the sleeve 114 by the lens frame 218 and the handle frame 240, which may be secured to the sleeve 114 using the screws 220 and 244.

In the exploded view 200 of FIG. 2, the first battery 226 and the second battery 228 are shown adjacent to the handle 116 and the handle frame 240 for illustrative purposes only. In a particular embodiment, the handle 116 may include a clip-on handle that may include one or more clips 252 to couple the handle 116 to the sleeve 114, while allowing the user to remove the handle 116 in order to replace one or more of the batteries 226 and 228. After assembly, the first battery 226, the second battery 228, and the handle frame 240 are disposed within the handle 116. In the example illustrated in FIG. 2, a seal 254 (e.g., a rubber seal or ring) may protect the components housed within the sleeve 114 from moisture, temperature, etc. that may be associated with an environment such as a kitchen, a refrigerator, or a freezer where the handheld electronic device 102 may be used.

In a particular embodiment, when assembled, the handheld electronic device 102 may be substantially square-shaped in an X-Y plane, with dimensions of about 31.5 mm×31.5 mm. The handheld electronic device 102 may have a Z-axis dimension of about 161.7 mm (including the substantially circular-shaped portion 118 of the handle 116). In a particular embodiment, the handheld electronic device 102 may weigh about 75 grams without the batteries 226 and 228 and may weigh about 125 grams with the batteries 226 and 228.

Figure 3:
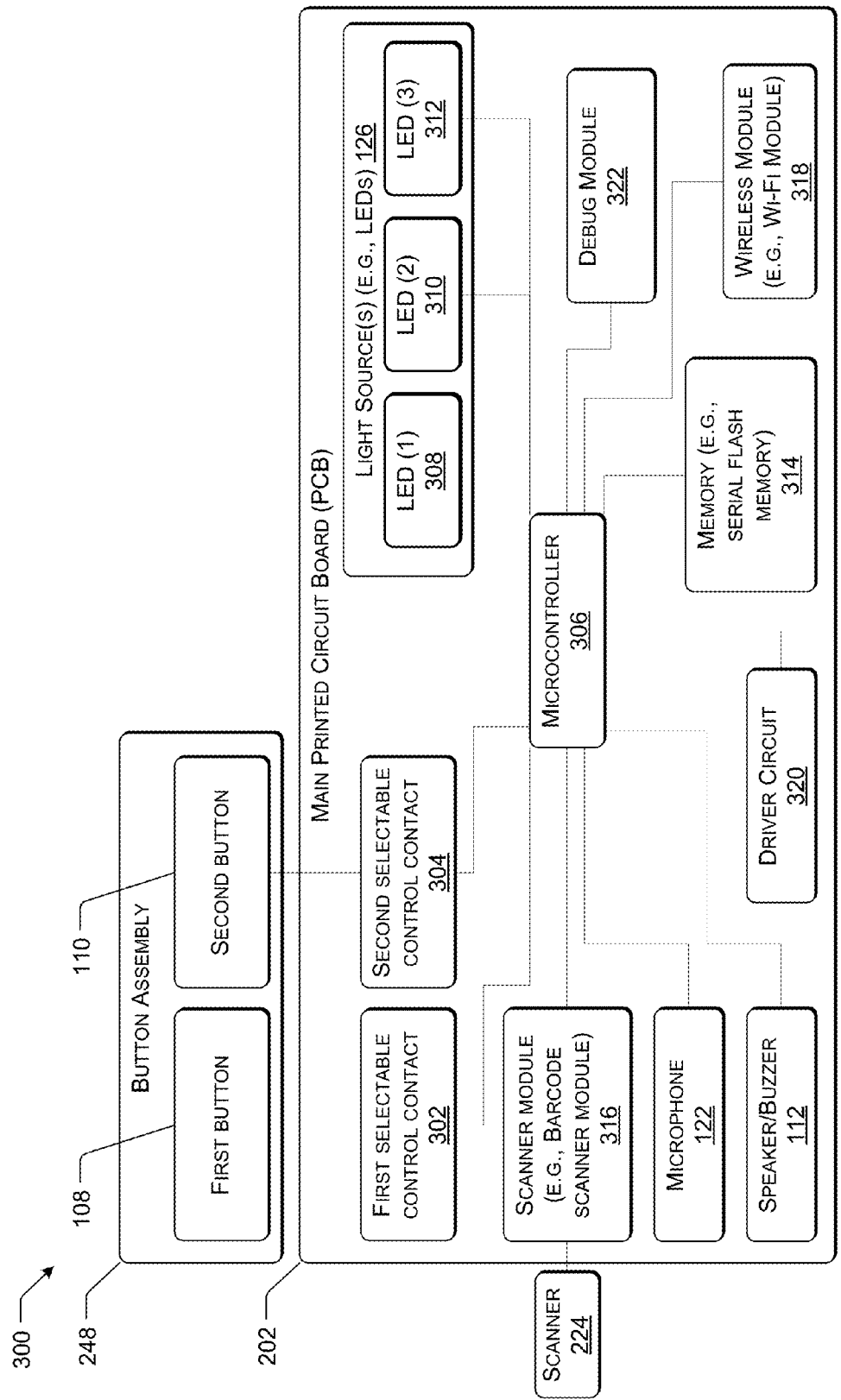
FIG. 3 is a block diagram illustrating select components of the example handheld electronic device of FIG. 1, according to some implementations.

Referring to FIG. 3, select components of the handheld electronic device 102, including multiple components associated with the main PCB 202, are illustrated and generally designated 300.

FIG. 3 illustrates that user selection (e.g., a button press) of the first button 108 of the button assembly 248 may result in electrical contact between an underside of the first button 108 and a first selectable control contact 302 of the main PCB 202. User selection (e.g., a button press) of the second button 110 of the button assembly 248 may result in electrical contact between an underside of the second button 110 and a second selectable control contact 304 of the main PCB 202. The first selectable control contact 302 and the second selectable control contact 304 may be electrically connected to a microcontroller 306 on the main PCB 202. In a particular embodiment, the microcontroller 306 may include an embedded processor with embedded memory (e.g., a 1 MB Flash memory) and static random-access memory (SRAM), such as a 132 KB static SRAM.

FIG. 3 further illustrates a particular embodiment in which the one or more light sources 126 includes a single-package three-die LED to display different colors (e.g., red, white, brilliant yellow, or a combination thereof). For example, a first light source 308, identified as LED(1) in FIG. 3, may correspond to an LED that displays a first color (e.g., red). A second light source 310, identified as LED(2) in FIG. 3, may correspond to an LED that displays a second color (e.g., white). A third light source 312, identified as LED(3) in FIG. 3, may correspond to an LED that displays a third color (e.g., brilliant yellow).

FIG. 3 further illustrates that the microcontroller 306 may be communicatively coupled to a memory 314 (e.g., a serial flash memory), the microphone 122, the speaker/buzzer 112, and a scanner module 316 (e.g., a barcode scanner module), a wireless module 318 (e.g., a Wi-Fi module), a driver circuit 320, and a debug module 322.

In some cases, the speaker/buzzer 112 may include a piezoelectric buzzer under pulse-width modulation (PWM) control. The buzzer 112 may be activated by a PWM signal under general-purpose input/output (GPIO) control by the microcontroller 306. In a particular embodiment, the buzzer 112 may have a resonant frequency of about 4 KHz. Other tones (i.e., frequencies) may be generated under firmware/PWM control by the microcontroller 306.

The microcontroller 306 may be configured to activate the microphone 122 in response to detecting electrical contact between the underside of the first button 108 of the button assembly 248 and the first selectable control contact 302 of the main PCB 202. In some cases, a voice input received from the user when the microphone 122 is active may be recorded and stored in the memory 314 as the audio data 528. Further, the microcontroller 306 may be configured to deactivate the microphone 122 in order to stop recording voice input from the user.

In a particular embodiment, the microcontroller 306 may be configured to deactivate the microphone 122 in response to detecting that the underside of the first button 108 is no longer in electrical contact with the first selectable control contact 302 of the main PCB 202. Thus, in this example, the user may select the first button 108 to begin recording and continue to depress the first button 108 until the user is finished speaking, after which the user may release the first button 108 to stop recording. In an alternative embodiment, the microcontroller 306 may be configured to deactivate the microphone 122 in response to detecting subsequent electrical contact between the underside of the first button 108 of the button assembly 248 and the first selectable control contact 302 of the main PCB 202. Thus, in this example, the user may select the first button 108 a first time to begin recording and select the first button 108 a second time to stop recording.

The microcontroller 306 may communicate with the scanner 224 housed in the sleeve frame 208 (see FIG. 2) via the scanner module 316 (e.g., a barcode scanner module). In some cases, scanner 224 may include a serial communication interface (SCI) to communicate with the scanner module 316 of the main PCB 202.

The microcontroller 306 may be configured to activate the scanner 224 via the scanner module 316 in response to detecting electrical contact between the underside of the second button 110 of the button assembly 248 and the second selectable control contact 304 of the main PCB 202. In some cases, an item identifier (e.g., barcode information) captured by the scanner 224 when the scanner 224 is active may be stored in the memory 314 as one or more scanned item identifiers (see e.g., the barcode data 530 of FIG. 5). Further, the microcontroller 306 may be configured to deactivate the scanner 224 via the scanner module 316.

In a particular embodiment, the microcontroller 306 may be configured to deactivate the scanner 224 via the scanner module 316 in response to detecting that the underside of the second button 110 is no longer in electrical contact with the second selectable control contact 304 of the main PCB 202. Thus, in this example, the user may select the second button 110 to activate the scanner and continue to depress the second button 110 until the user is finished scanning one or more items, after which the user may release the second button 110 to deactivate the scanner 224. In an alternative embodiment, the microcontroller 306 may be configured to deactivate the scanner 224 via the scanner module 316 in response to detecting subsequent electrical contact between the underside of the second button 110 of the button assembly 248 and the second selectable control contact 304 of the main PCB 202. Thus, in this example, the user may select the second button 110 a first time to begin scanning item(s) and select the second button 110 a second time to stop scanning item(s).

In a particular embodiment, the wireless module 318 may include hardware, such as an Institute of Electrical and Electronics Engineers (IEEE) 802.11b/g/n single band (e.g., 2.4 GHz) radio that may communicate via a single antenna (e.g., the antenna 212 illustrated in FIG. 2). In some cases, the wireless module 318 may have a maximum transmission (Tx) power of about +19 dBm (CCK) for 802.11b communications, a maximum Tx power of about +18 dBm (11g OFDM) for 802.11g communications, and a maximum Tx power of about +18 dBm (11n MCS0) for 802.11n communications.

The wireless module 318 may be activated to establish a wireless connection (e.g., with a wireless access point (WAP) of the user). In some cases, the microcontroller 306 may be configured to activate the wireless module 318 in order to establish a wireless connection with a particular WAP based on connection information that may be stored in the memory 314. For example, a service set identifier (SSID) and an (optional) password associated with the particular WAP may be stored in the memory 314 and may be used to establish the wireless connection. After establishing the wireless connection, information stored in the memory 314 (e.g., one or more audio files, one or more identifiers, or combination thereof) may be communicated to a delivery service for processing.

Figure 4:
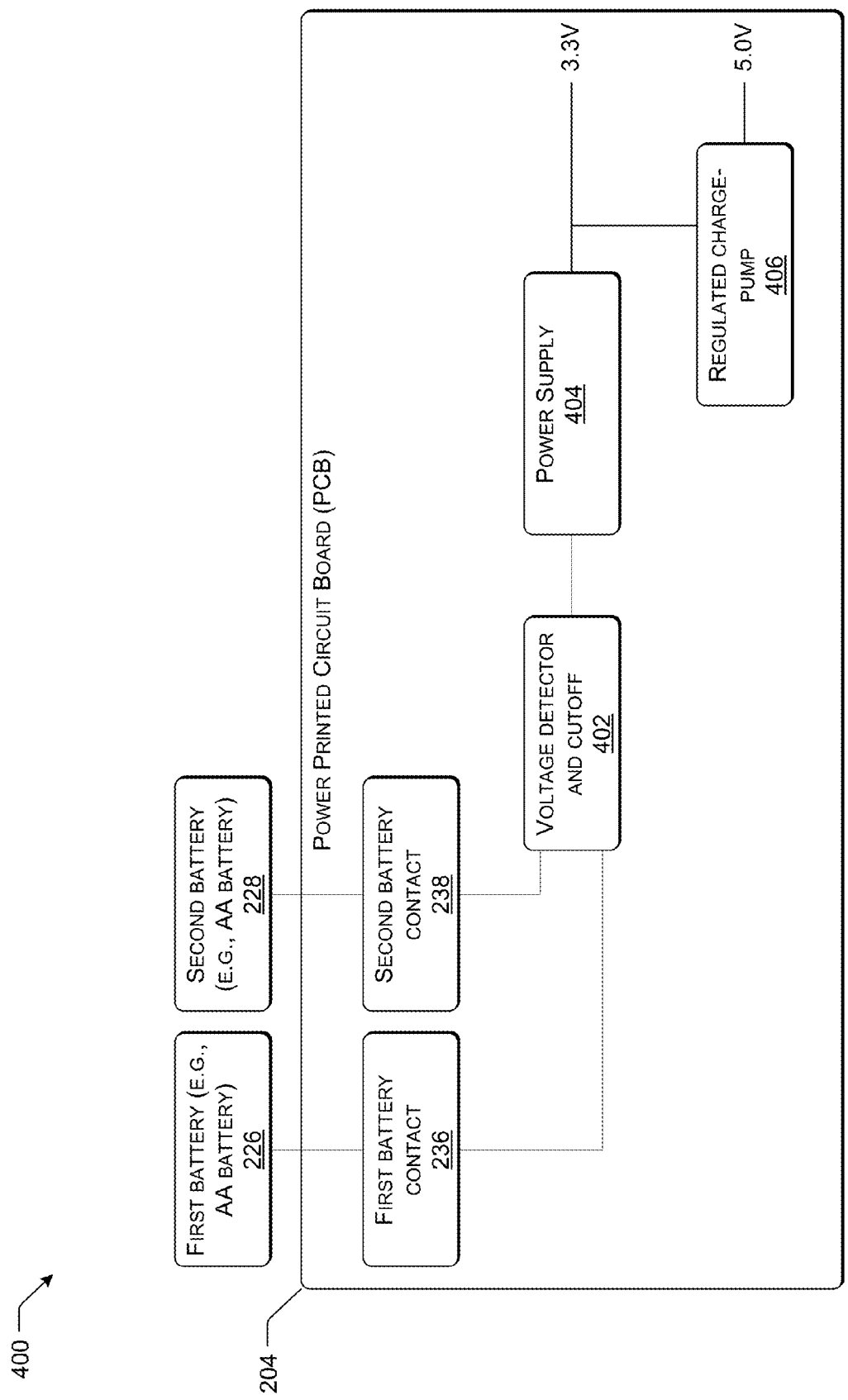
FIG. 4 is a block diagram illustrating select components of the example handheld electronic device of FIG. 1, according to some implementations.

Referring to FIG. 4, select components of the handheld electronic device 102, including multiple components associated with the power PCB 204, are illustrated and generally designated 400.

FIG. 4 illustrates that the first battery 226 may be electrically connected to the first battery contact 236 of the power PCB 204, and the second battery 228 may be electrically connected to the second battery contact 238 of the power PCB 204. In the example illustrated in FIG. 4, the power PCB 204 also includes a voltage detector and cutoff component 402 and a power supply 404. In a particular embodiment, the power supply 404 may include a Buck-Boost Topology Switched-mode power supply. The power supply 404 may receive a first voltage (e.g., 3.3V) or may receive a second voltage (e.g., 5.0V) via a regulated charge-pump 406. The voltage detector and cutoff component 402 is communicatively coupled to the first battery contact 236, the second battery contact 238, and the power supply 404.

In the example illustrated, the first battery 226 and the second battery 228 are AA size primary or secondary (rechargeable) cells. An expected voltage input from these cells may be between about 1.8V and about 3.6V. At an end of cell life (e.g., about 0.9V/cell), the voltage detector and cutoff component 402 may be configured to place the handheld electronic device 102 into a low-quiescent power mode to postpone critical cell-leakage thresholds (generally below 0.5V/cell). The handheld electronic device 102 may be protected from battery cell reversal by physically preventing a reversed battery from making electrical contact. As illustrated in the example of FIG. 2, the positive terminals are recesses. As such, if one or more of the batteries 226 and 228 are reversed, the battery connection may become an open circuit.

In some cases, the microcontroller 306 may be configured to access the voltage detector and cutoff component 402 to measure battery voltage. In some cases, the microcontroller 306 may be configured to trigger an alert to the user as battery life is approaching the end (see e.g., the low battery indications 1102 and 1104 illustrated in FIG. 11). In some cases, user warnings may be issued when cells approach a threshold voltage of about 1.0V per cell, and the threshold voltage may be programmed into firmware of the microcontroller 306 for processing purposes. In a particular embodiment, the handheld electronic device 102 may communicate battery power state information to the one or more remote computing device 520. As an illustrative, non-limiting example, the user 502 may be able to view the battery power state information (e.g., via a delivery service user interface). Further, as another illustrative example, the application module 540 (see e.g., FIG. 5) may automatically add one or more batteries (e.g., two AA size batteries) to the virtual shopping cart stored in the cart database 546 for delivery to the user 502.

To support battery life, the hardware of the handheld electronic device 102 may be capable of entering ultra-low quiescent power modes when idle. These modes may include shutting down of the scanner 224, the microphone 122, and LED power supply and microcontroller 306 sleep state. In some cases, a button press by the user may bring the system back to full operation in less than about 100 milliseconds. Absolute battery life may be influenced by Wi-Fi communications (e.g., with the user's WAP). As such, dynamically changing a Wi-Fi transmit power level may extend battery life.

Figure 5:
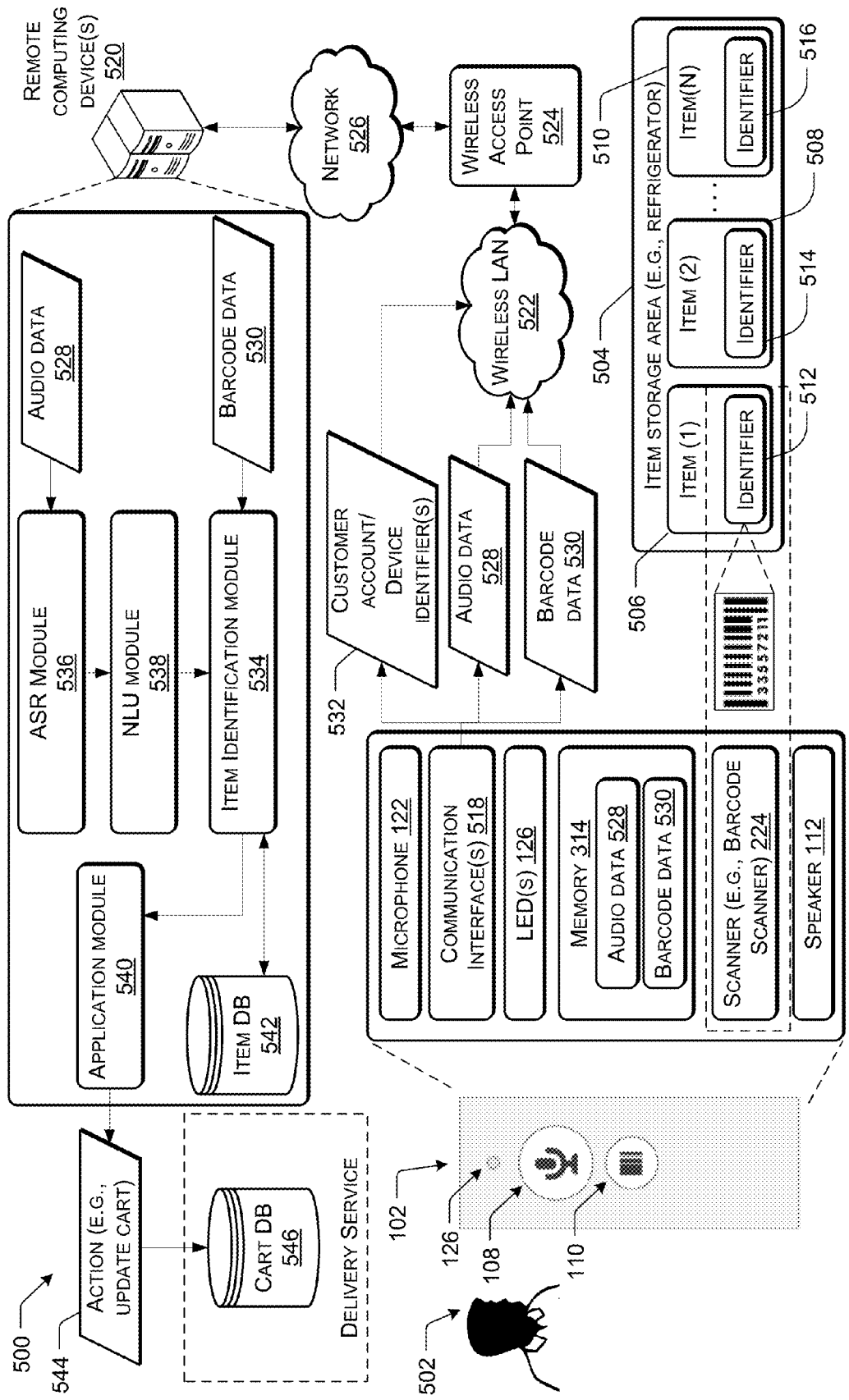
FIG. 5 illustrates an example architecture for a delivery service that receives voice and scanner input from a handheld electronic device, according to some implementations.

FIG. 5 illustrates an example framework 500 for a delivery service that receives voice input and scanner input from the handheld electronic device 102, according to some implementations. FIG. 5 shows illustrative interactions between the handheld electronic device 102, a user 502, and a remote system when performing various operations, including ordering products (e.g., groceries) for home delivery. The handheld electronic device 102 allows the user 502 to both scan an item and to provide voice information to identify a particular product.

In the illustrative example of FIG. 5, the first selectable control 108 of the handheld electronic device 102 includes a first user actuatable button identified by a microphone icon, and the second selectable control 110 includes a second user actuatable button identified by a barcode icon. The handheld electronic device 102 includes the microphone 122 (or other audio input component) configured to receive a voice input from the user 502. The handheld electronic device 102 further includes the scanner 224 (e.g., a barcode scanner or other optical component such as a camera) to scan an item identifier (e.g., a barcode on a product package). The scanner 224 may be activated in response to the user actuation of the second button 110. To illustrate, the user 502 may select the second button 110 while the user 502 is pointing the handheld electronic device 102 towards a particular item to be identified. In some cases, at least one of the one or more light sources 126 (e.g., LEDs) may be illuminated in response to user actuation of one or both of the buttons 108 and 110.

FIG. 5 further illustrates an item storage area 504 (e.g., a refrigerator or a pantry, among other alternatives) that includes one or more items. In the example of FIG. 5, the item storage area 504 includes a first item 506 identified as Item (1) and a second item 508 identified as Item (2). It will be appreciated that the item storage area 504 may include alternative numbers of items, with an Nth item 510 identified as Item (N) in FIG. 5. Each item in the item storage area 504 may include a barcode or other visual identifier (e.g., a product logo, etc.) on a product package. For example, as illustrated in FIG. 5, an identifier 512 of the first item 506 may include a scannable barcode. While not illustrated in FIG. 5, an identifier 514 of the second item 508 and an identifier 516 of the Nth item 510 may also include scannable barcodes or other visual identifiers.

The handheld electronic device 102 further includes one or more communication interfaces 518 to communicate with one or more remote computing devices 520 associated with a delivery service. In some embodiments, the one or more communication interfaces 518 may support at least a wireless connection to various networks, such as a WiFi network. To illustrate, the one or more communication interfaces 518 may be associated with the wireless module 318 illustrated in FIG. 3. Further, in some cases, the one or more communication interfaces 518 may support both wired and wireless connections to various networks, such as cellular networks, radio, WiFi networks, short-range or near-field networks (e.g., Bluetooth®), infrared signals, local area networks, wide area networks, the Internet, and so forth. In some cases, the one or more communication interfaces 518 may further allow the user 502 to access storage on another device, such as a user's computing device, a network attached storage device, or the like.

In some cases, the handheld electronic device 102 may have access to the Internet via a WiFi connection, or via a cellular telephone network (e.g., a Long Term Evolution or LTE network). In the example of FIG. 5, the handheld electronic device 102 may have access to the Internet via a wireless local area network (WLAN) 522 connection with a wireless access point (WAP) 524, which may be connected to a network 526 (e.g., the Internet) via a wired connection (e.g., via a cable modem or a digital subscriber line (DSL) modem, among other alternatives).

The network 526 may be a publicly accessible network of linked networks, possibly operated by various distinct parties, such as the Internet. In other embodiments, the network 526 may include a private network, personal area network ("PAN"), LAN, WAN, cable network, satellite network, etc. or some combination thereof, each with access to and/or from the Internet. For example, the one or more remote computing devices 520 may be located within a single data center, and may communicate via a private network as described above.

The handheld electronic device 102 is configured to store voice input(s) from the user 502 received via the microphone 122 in the memory 314 as audio data 528. In a particular embodiment, the audio data 528 may be stored in the memory 314 as one or more audio files. Further, the handheld electronic device 102 is configured to store information associated with one or more scanned item identifiers (e.g., barcodes) in the memory 314 (e.g., as the barcode data 530). The handheld electronic device 102 may communicate the audio data 528 and the barcode data 530 to the one or more remote computing devices 520. Further, the handheld electronic device 102 may be configured to communicate identifier(s) 532 (e.g., at least one of a customer account identifier or a device identifier) to the one or more remote computing devices 520. While not shown in the example of FIG. 5, in some cases the identifier(s) 532 may be stored in the memory 314.

The handheld electronic device 102 may correspond to a wide variety of electronic devices. In some embodiments, the handheld electronic device 102 may be a computing device that includes one or more processors (e.g., the microcontroller 306 of FIG. 3), and the memory 314 may contain software applications executed by the microcontroller 306 (see e.g., the computing device 1200 of FIG. 12). Software of the handheld electronic device 102 may include components for establishing communications over wireless or wired communication networks or directly with other computing devices. In some cases, the handheld electronic device 102 may include an electronic device that is dedicated to ordering or reordering products via voice, scanning or a combination thereof.

The one or more remote computing devices 520 of FIG. 5 include item identification processing capabilities as well as spoken language processing capabilities. Spoken language processing systems generally include various modules and components for receiving speech input from a user, determining what the user said, and determining what the user meant. For example, a natural language processing ("NLP") system may perform speech recognition and generate spoken language processing results, including the likely meaning of user utterances, for use by applications that respond to user utterances. FIG. 5 illustrates a particular example of an NLP system that includes components to perform various automatic speech recognition (ASR) operations and natural language understanding (NLU) operations.

In the embodiment illustrated in FIG. 5, the one or more remote computing devices 520 include an item identification module 534, an ASR module 536, an NLU module 538, and an application module 540. The item identification module 534 is configured to identify the scanned item (e.g., the first item 506 in the example of FIG. 5) based on the barcode data 530 (e.g., barcode information or an image of a product logo) received from the handheld electronic device 102. For example, the item identification module 534 may query at least one item database (DB) 542 that stores information for a plurality of items, with each item associated with one or more product identifiers.

FIG. 5 illustrates an example in which speech recognition is performed on the one or more remote computing devices 520. That is, the handheld electronic device 102 may not include speech recognition capabilities but rather may include audio recording capabilities to record the voice input and store the recording as the audio data 528 in the memory 314. The recorded voice input may be communicated from the handheld electronic device 102 to the one or more remote computing devices 520 for transcription by the ASR module 536. The ASR module 536 is configured to receive the audio data 528 and to generate one or more likely transcriptions of the utterance. In some cases, the ASR module 536 may provide a transcription or N-best list of transcriptions to the NLU module 538. The NLU module 538 may identify particular words (e.g., named entities) in the transcription or N-best list of transcriptions that are of particular importance in determining the user's intent.

The NLU module 538 is configured to generate a semantic representation of the user utterance based on the information from the ASR module 536. That is, the NLU module 538 may determine what the user 502 would like to do, also known as the user intent, based on recognized speech. A semantic representation may include one or more user intents and one or more named entities.

After the NLU module 538 has produced results (e.g., has determined one or more likely interpretations) and, optionally, scores for those results (such as a confidence score representing a probability that the results are valid or accurate), the most likely or appropriate interpretation may be selected. The NLU module 538 may generate an output that may be used by a computer application (e.g., the application module 540) to respond or otherwise perform an action 544 according to the user's intent. For example, the voice input from the user 502 may be associated with a particular item to be ordered, and the action 544 may include updating a virtual shopping cart of the user 502 (e.g., stored in a cart database 546 associated with the delivery service).

In the example of FIG. 5, the components of the NLP system are illustrated as being stored on one or more remote computing devices 520. In some embodiments, the NLP system can include several devices physically or logically grouped together, such as an application server computing device configured to perform speech recognition on an utterance and a database server computing device configured to store records and speech recognition models. In multi-device implementations, the various devices may communicate via an internal communication network, such as a corporate or university network configured as a local area network ("LAN") or a wide area network ("WAN"). In some cases, the devices may communicate over an external network, such as the Internet, or a combination of internal and external networks.

In some embodiments, the features and services provided by the NLP system may be implemented as web services consumable via the network 526. In further embodiments, the features and services may be provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In the embodiment illustrated in FIG. 5, speech processing is performed on the one or more remote computing devices 520 (e.g., via the ASR module 536 and the NLU module 538). That is, in some cases, the handheld device 102 may not include component(s) to perform speech processing operations but rather may record speech received from the user 502, store the speech as audio data in the memory 314, and communicate the data for remote processing. Alternatively, in some cases, one or more speech processing operations may be performed at the handheld electronic device 102. For example, the handheld electronic device 102 may store an ASR module locally in the memory 314 and may be configured to perform speech processing operations in a manner similar to or the same as the ASR module 536 illustrated as stored on the one or more remote computing devices 520 in FIG. 5.

Further, in the embodiment illustrated in FIG. 5, processing of the scanned identifier(s) (e.g., the barcode data 530) is performed on the one or more remote computing devices 520 (e.g., via the item identification module 534 using the item database 542). That is, in some cases, the handheld device 102 may not include component(s) to perform item identification processing operation(s) but rather may scan an item identifier (e.g., a barcode), store the barcode as barcode data in the memory 314, and communicate the data for remote processing. Alternatively, in some cases, one or more item identification processing operations may be performed at the handheld electronic device 102. For example, the handheld electronic device 102 may store an item identification module (and associated item database) locally in the memory 314. As such, the handheld electronic device 102 may perform one or more item identification processing operations in a manner similar to or the same as the item identification module 534 (and item DB 542) illustrated as stored on the one or more remote computing devices 520 in FIG. 5.

FIGS. 6-11 illustrate examples of feedback provided to the user 502 via the handheld electronic device 102. It will be appreciated that various types of feedback may be provided, including different types of audio feedback (e.g., changes in tone, content, or volume, etc.), different types of visual feedback (e.g., various colors for the one or more LEDs 126, color display patterns, such as blinking or different colors in a sequence, etc.), haptic feedback, or other types of feedback.

Figure 6:
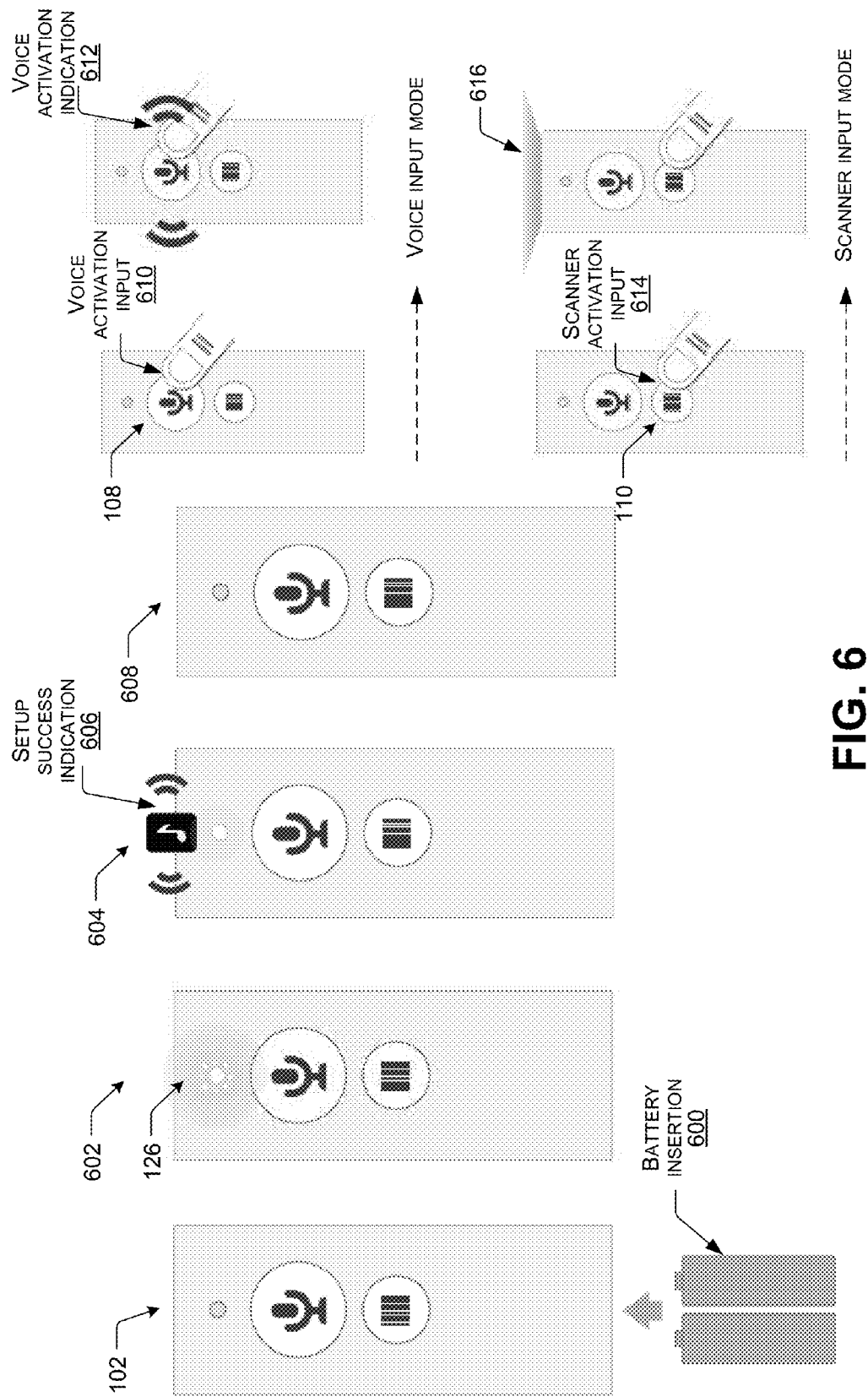
FIGS. 6-11 illustrate examples of feedback provided to a user via the handheld electronic device, according to some implementations.

Referring to FIG. 6, examples of feedback provided to the user 502 via the handheld electronic device 102 are illustrated. In some cases, when the batteries 226 and 228 are initially inserted, as shown at 600, the handheld electronic device 102 may enter a setup mode. A first example of feedback provided to the user 502 via the handheld electronic device 102 is illustrated and generally designated 602. In some cases, after battery insertion, the feedback 602 may alert the user 502 that the handheld electronic device 102 is in a setup mode. In the example illustrated in FIG. 6, at least one of the one or more LEDs 126 (e.g., a white LED) may pulse during the setup mode.

A second example of feedback provided to the user 502 via the handheld electronic device 102 is illustrated and generally designated 604. For example, the feedback 604 may provide an indication to the user 502 that setup was successful. In some cases, the pulsing LED 126 may become a solid LED after a predetermined period of time (e.g., after five seconds). Alternatively or additionally, as shown at 606, there may be a short confirmation tone/melody (e.g., provided via the speaker 112) to provide an indication to the user 502 that setup was successful.

Another example of feedback provided to the user 502 via the handheld electronic device 102 is illustrated and generally designated 608. After the predetermined period of time for the LED to remain solid has elapsed (e.g., after five seconds), the solid LED (e.g., the white LED) may turn off. Alternatively or additionally, when the short confirmation tone/melody is provided to indicate that setup was successful (as shown at 606), the tone/melody may be turned off.

After successful device setup, FIG. 6 illustrates an example of feedback that may be provided to the user 502 via the handheld electronic device 102 in response to a voice activation input 610 from the user 502 (e.g., a user actuation of the first button 108). In response to the voice activation input 610 received from the user 502, the handheld electronic device 102 may enter a voice input mode and may provide a voice activation indication 612 (e.g., a beep generated by the speaker/buzzer 112), prompting the user 502 to speak.

After successful device setup, FIG. 6 illustrates another example of feedback that may be provided to the user 502 via the handheld electronic device 102 in response to a scanner activation input 614 received from the user 502 (e.g., a user actuation of the second button 110). In response to the scanner activation input 614, the handheld electronic device 102 may enter a scanner input mode and may activate a scanner light (e.g., a red scanner light), as shown at 616, thereby prompting the user 502 to scan a barcode (or another identifier). Further, in some cases, the handheld electronic device 102 may provide a scanner activation indication (e.g., a beep generated by the speaker/buzzer 112). While not shown in the example of FIG. 6, in some cases, after a successful scan, the handheld electronic device 102 may provide a confirmation indication (e.g., a beep generated by the speaker/buzzer 112) to inform the user 502 that the scan was successful (see e.g., the scanner success indication 902 of FIG. 9).

Figure 7:
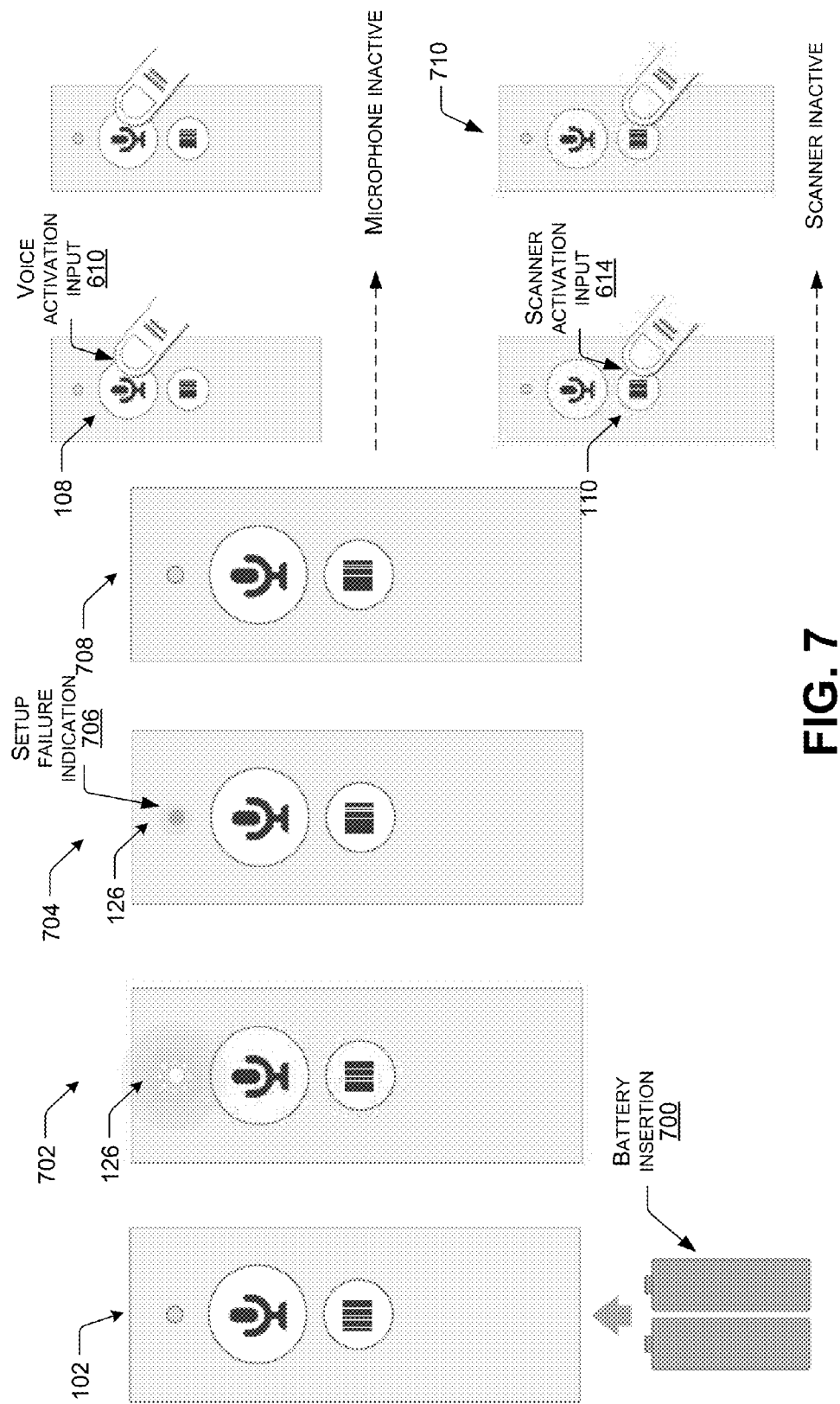

Referring to FIG. 7, examples of feedback provided to the user 502 via the handheld electronic device 102 are illustrated. In some cases, when the batteries 226 and 228 are initially inserted, as shown at 600, the handheld electronic device 102 may enter a setup mode. A first example of feedback provided to the user 502 via the handheld electronic device 102 is illustrated and generally designated 702. In some cases, after battery insertion, the feedback 702 may alert the user 502 that the handheld electronic device 102 is in a setup mode. In the example illustrated in FIG. 7, at least one of the one or more LEDs 126 (e.g., a white LED) may pulse during the setup mode.

A second example of feedback provided to the user 502 via the handheld electronic device 102 is illustrated and generally designated 704. For example, the feedback 704 may provide an indication to the user 502 that setup was not successful. To illustrate, at least one of the one or more LEDs 126 (e.g., a white LED) illustrated as pulsing at 702 may stop pulsing. One or more alternative or additional LEDs 126 (e.g., a solid amber LED) may become a solid LED (e.g., a solid amber LED) and may remain on for predetermined period of time (e.g., for five seconds), thereby providing a setup failure indication 706 to the user 502. Alternatively or additionally, while not shown in the example of FIG. 7, there may be a short tone/melody (e.g., generated by the speaker/buzzer 112) to provide an indication to the user 502 that device setup was not successful.

Another example of feedback provided to the user 502 via the handheld electronic device 102 is illustrated and generally designated 708. After the predetermined period of time for the LED to remain solid has elapsed (e.g., after five seconds), the solid LED (e.g., the amber LED) may turn off. Alternatively or additionally, when a short tone/melody is provided to indicate that device setup was not successful, the tone/melody may be turned off.

In contrast to FIG. 6, FIG. 7 illustrates that when device setup was unsuccessful, the handheld electronic device 102 may not provide the voice activation indication 612 (e.g., a beep) in response to the voice activation input 610, and the microphone 122 may remain inactive. While not illustrated in the example of FIG. 7, the handheld electronic device 102 may provide an alternative indication (e.g., a different beep, a vibration, or an activation of at least one of the LEDs 126, among other alternatives) in order to alert the user 502 that the microphone 122 remains inactive.

Further, in contrast to FIG. 6, FIG. 7 illustrates that when device setup was unsuccessful, the handheld electronic device 102 may not provide a scanner activation indication (e.g., the activation of the red scanner light as shown at 616 in FIG. 6) in response to the scanner activation input 614. Rather, as shown at 710, the red scanner light is not on, thereby indicating to the user 502 that the handheld electronic device 102 has not entered the scanner input mode and that the scanner 224 remains inactive. While not illustrated in the example of FIG. 7, the handheld electronic device 102 may provide another indication (e.g., a beep, a vibration, or an activation of at least one of the LEDs 126, among other alternatives) in order to alert the user 502 that the scanner 224 remains inactive.

Figure 8:
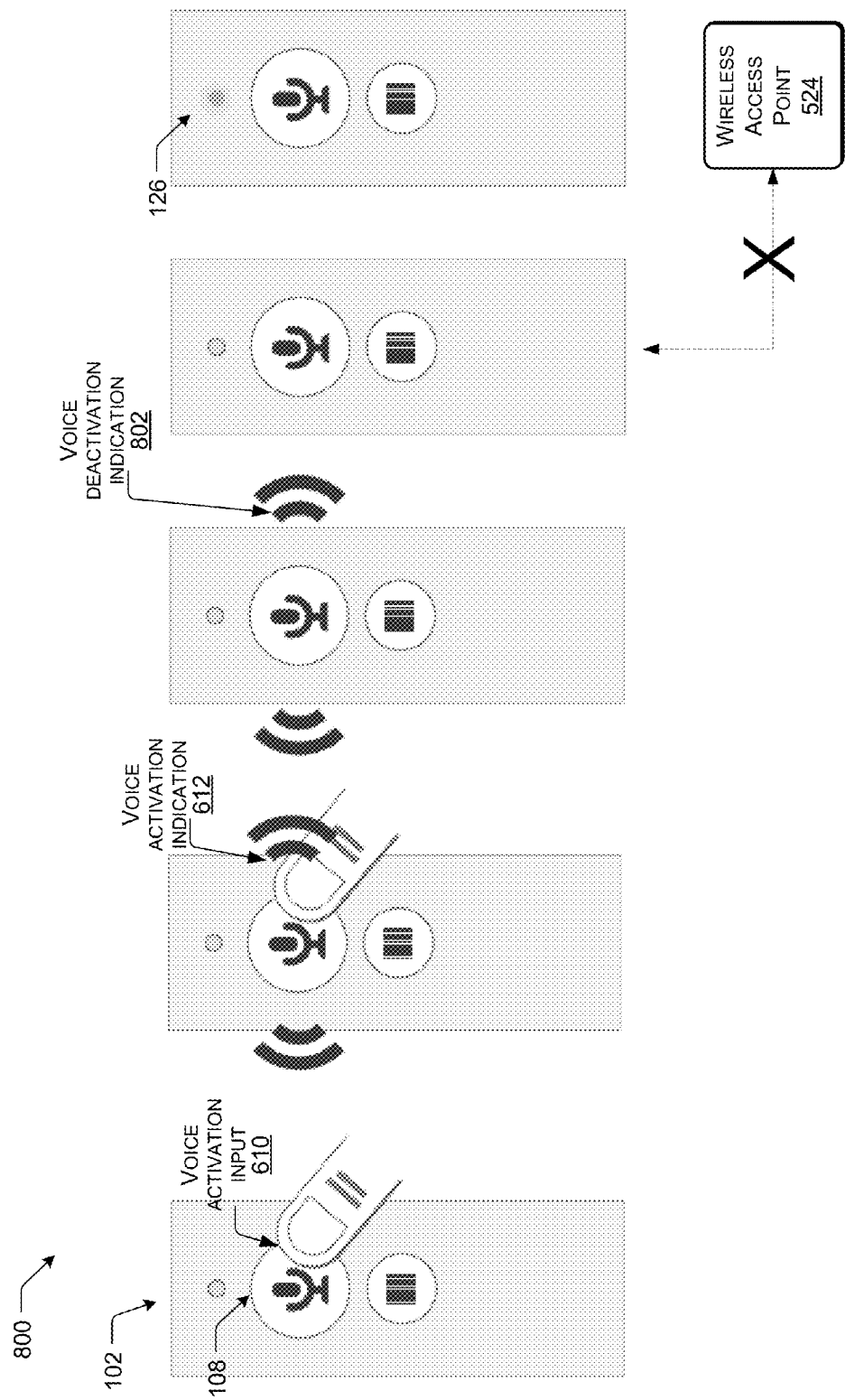

Referring to FIG. 8, an example sequence of user input and feedback provided to the user 502 via the handheld electronic device 102 is illustrated and generally designated 800.

In some cases, the user 502 may provide the voice activation input 610 when the handheld electronic device 102 is inactive or in a low power state. For example, at least the wireless module 318 (see FIG. 3) may be inactive. Accordingly, there may be no established wireless connection between the handheld electronic device 102 and the WAP 524 (see FIG. 5). In the example illustrated in FIG. 8, the voice activation input 610 includes user actuation of the first button 108 including the microphone icon. Referring to FIG. 3, the microcontroller 306 may detect that an underside of the first button has electrically contacted the first selectable control contact 302 of the main PCB 202. In response, the microcontroller 306 may activate at least the speaker/buzzer 112 (in order to provide the voice activation indication 612 to the user 502) and the microphone 122 (in order to record a voice input from the user 502).

In the particular example illustrated in FIG. 8, after receiving the voice activation input 610, the user 502 may continue to depress the first button 108 until the user 502 has finished speaking FIG. 8 illustrates that a voice deactivation indication 802 (e.g., a beep) may provide feedback to the user 502 to indicate that the microphone 122 is no longer recording the user's speech. The voice deactivation indication 802 may provide privacy protection so that the user 502 knows that her speech is no longer being recorded. Referring to FIG. 3, the microcontroller 306 may detect that the underside of the first button 108 is no longer electrically connected to the first selectable control contact 302. In response, the microcontroller 306 may deactivate the microphone 122 to stop recording speech from the user 502.

In some cases, the user 502 may provide a voice input while the handheld electronic device 102 is attempting to establish a wireless connection with the WAP 524. FIG. 8 illustrates that, in some cases, if the handheld electronic device 102 is unable to establish a wireless connection with the WAP 524 within a predetermined period of time, the handheld electronic device 102 may provide an associated indication to the user 502. For example, FIG. 8 illustrates a particular embodiment in which a solid LED 126 (e.g., a solid amber LED) may be displayed and may remain on for predetermined period of time (e.g., for five seconds). Alternatively or additionally, while not shown in the example of FIG. 8, the indication to the user 502 may include a short tone/melody (e.g., provided via the speaker 112). Referring to FIG. 5 as an example, the user 502 may continue to operate the handheld electronic device 102 in the voice input mode, with the voice input being recorded and stored in the memory 314 (e.g., as the audio data 528). The audio data 528 may remain stored in the memory 314 until the handheld electronic device 102 is able to establish a wireless connection with the WAP 524 to communicate the stored audio data 528 to the one or more remote computing devices 520.

Figure 9:
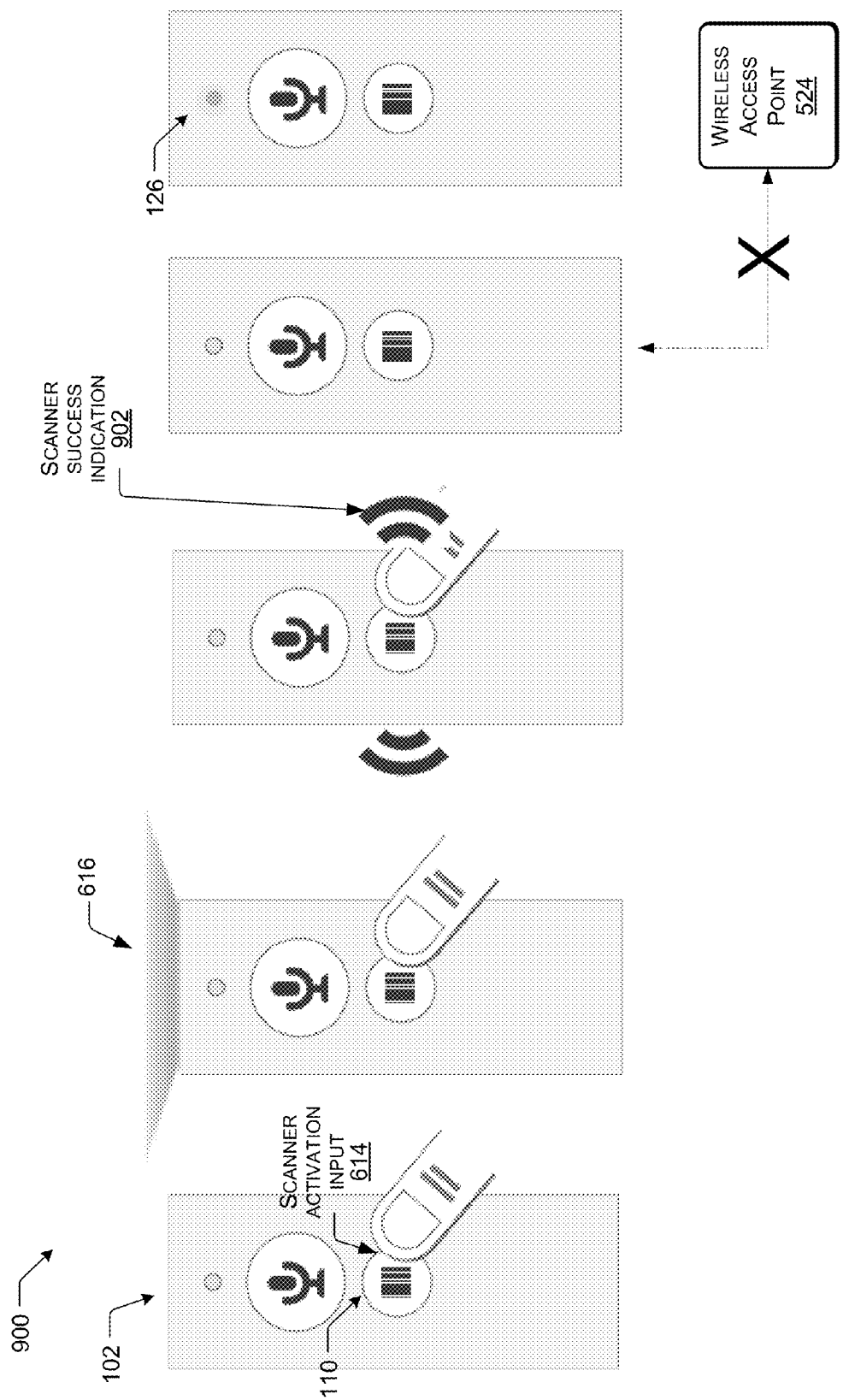

Referring to FIG. 9, an example sequence of user input and feedback provided to the user 502 via the handheld electronic device 102 is illustrated and generally designated 900.

In some cases, the user 502 may provide the scanner activation input 614 when the handheld electronic device 102 is inactive or in a low power state. For example, at least the wireless module 318 (see FIG. 3) may be inactive. Accordingly, there may be no established wireless connection between the handheld electronic device 102 and the WAP 524 (see FIG. 5). In the example illustrated in FIG. 9, the scanner activation input 614 includes user actuation of the second button 110 including the barcode icon. Referring to FIG. 3, the microcontroller 306 may detect that an underside of the second button 110 has electrically contacted the second selectable control contact 304. In response, the microcontroller 306 may activate at least the scanner 224 via the scanner module 316 to allow the user 502 to scan one or more identifiers (e.g., barcodes). FIG. 9 illustrates that activation of the scanner 224 may include activation of the red scanner light, as shown at 616.

In the particular example illustrated in FIG. 9, the user 502 may continue to depress the second button 110 until the user 502 has finished scanning one or more item identifiers (e.g., barcodes). FIG. 9 illustrates that a scanner success indication 902 (e.g., a beep) may provide feedback to the user 502 to indicate that a particular item identifier (e.g., a barcode) was successfully scanned. Further, in some cases, the red scanner light may be deactivated to provide feedback to the user 502 that scanning was successful. In some cases, the scanner success indication 902 may be provided after each successful barcode scan in the event that the user 502 scans multiple barcodes while the second button 110 remains depressed. After the user 502 has finished scanning the item identifier(s), the user 502 may release the second button 110. Referring to FIG. 3, the microcontroller 306 may detect that the underside of the second button 110 is no longer electrically connected to the second selectable control contact 304. In response, the microcontroller 306 may deactivate the scanner 224 via the scanner module 316.

In some cases, the user 502 may scan item identifier(s) while the handheld electronic device 102 is attempting to establish a wireless connection with the WAP 524. In some cases, if the handheld electronic device 102 is unable to establish a wireless connection with the WAP 524 within a predetermined period of time, the handheld electronic device 102 may provide an associated indication to the user 502. For example, FIG. 9 illustrates a particular embodiment in which a solid LED 126 (e.g., a solid amber LED) may be displayed and may remain on for predetermined period of time (e.g., for five seconds). Alternatively or additionally, while not shown in the example of FIG. 9, the indication to the user 502 may include a short tone/melody (e.g., provided via the speaker 112). Referring to FIG. 5 as an example, the user 502 may continue to operate the handheld electronic device 102 in the scanner input mode, with scanned data being recorded and stored in the memory 314 (e.g., as the barcode data 530). The scanned data may remain stored in the memory 314 until the handheld electronic device 102 is able to establish a wireless connection with the WAP 524 to communicate the stored barcode data 530 to the one or more remote computing devices 520.

Figure 10:
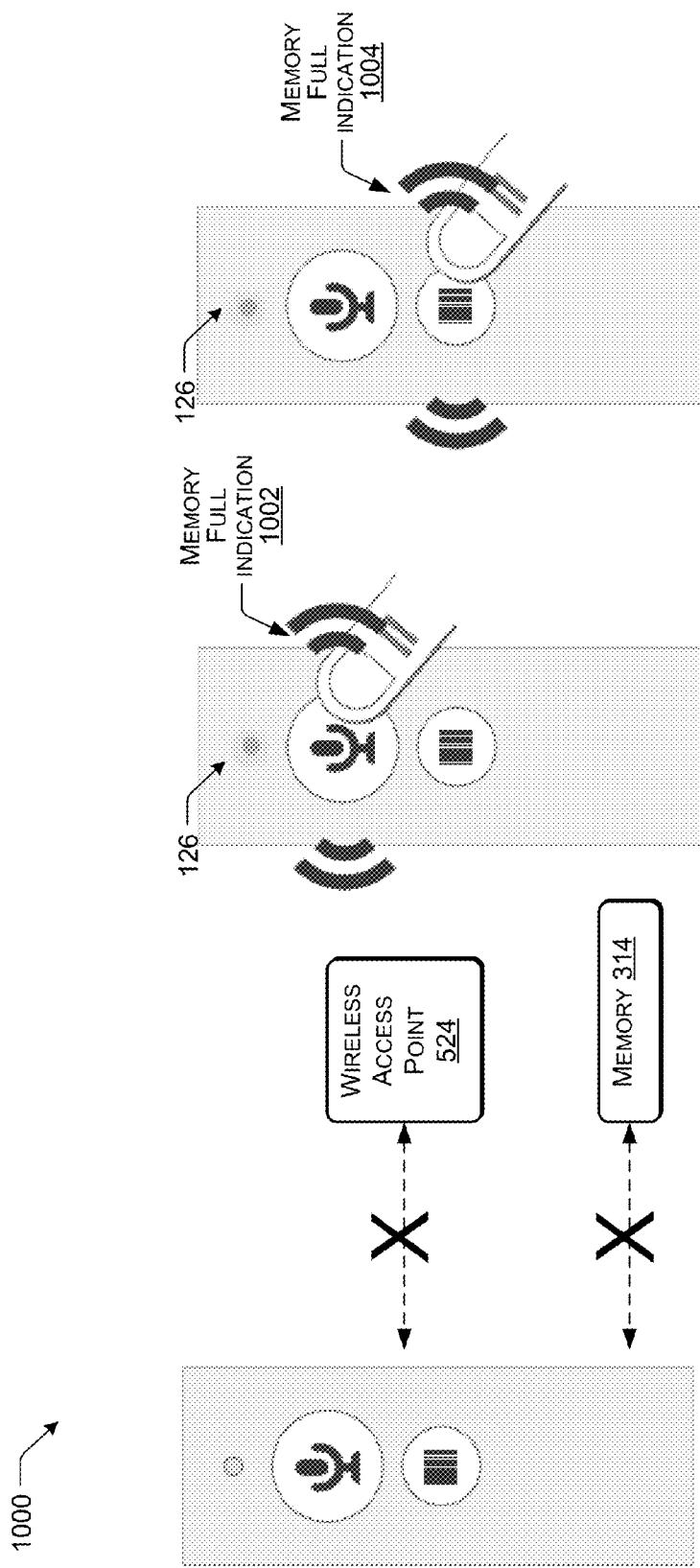

Referring to FIG. 10, an example of feedback provided to the user 502 via the handheld electronic device 102 is illustrated and generally designated 1000.

As a first example, as described above with respect to FIG. 8, when the handheld electronic device 102 is unable to establish a wireless connection with the WAP 524 while operating in the voice input mode, the user 502 may continue providing voice input, with the voice input being recorded and stored as audio data in the memory 314. FIG. 10 illustrates that, in the event that the handheld electronic device 102 is unable to establish a wireless connection with the WAP 524 before the memory 314 is full, a memory full indication 1002 may be provided to notify the user 502 that speech may no longer be recorded and stored to the memory 314.

As another example, as described above with respect to FIG. 9, when the handheld electronic device 102 is unable to establish a wireless connection with the WAP 524 when operating in the scanner input mode, the user 502 may continue to use the scanner 224, with scanned data stored in the memory 314. FIG. 10 illustrates that, in the event that the handheld electronic device 102 is unable to establish a wireless connection with the WAP 524 before the memory 314 is full, a memory full indication 1004 may be provided to notify the user 502 that identifier data (e.g., barcode data) may no longer be stored to the memory 314.

Figure 11:
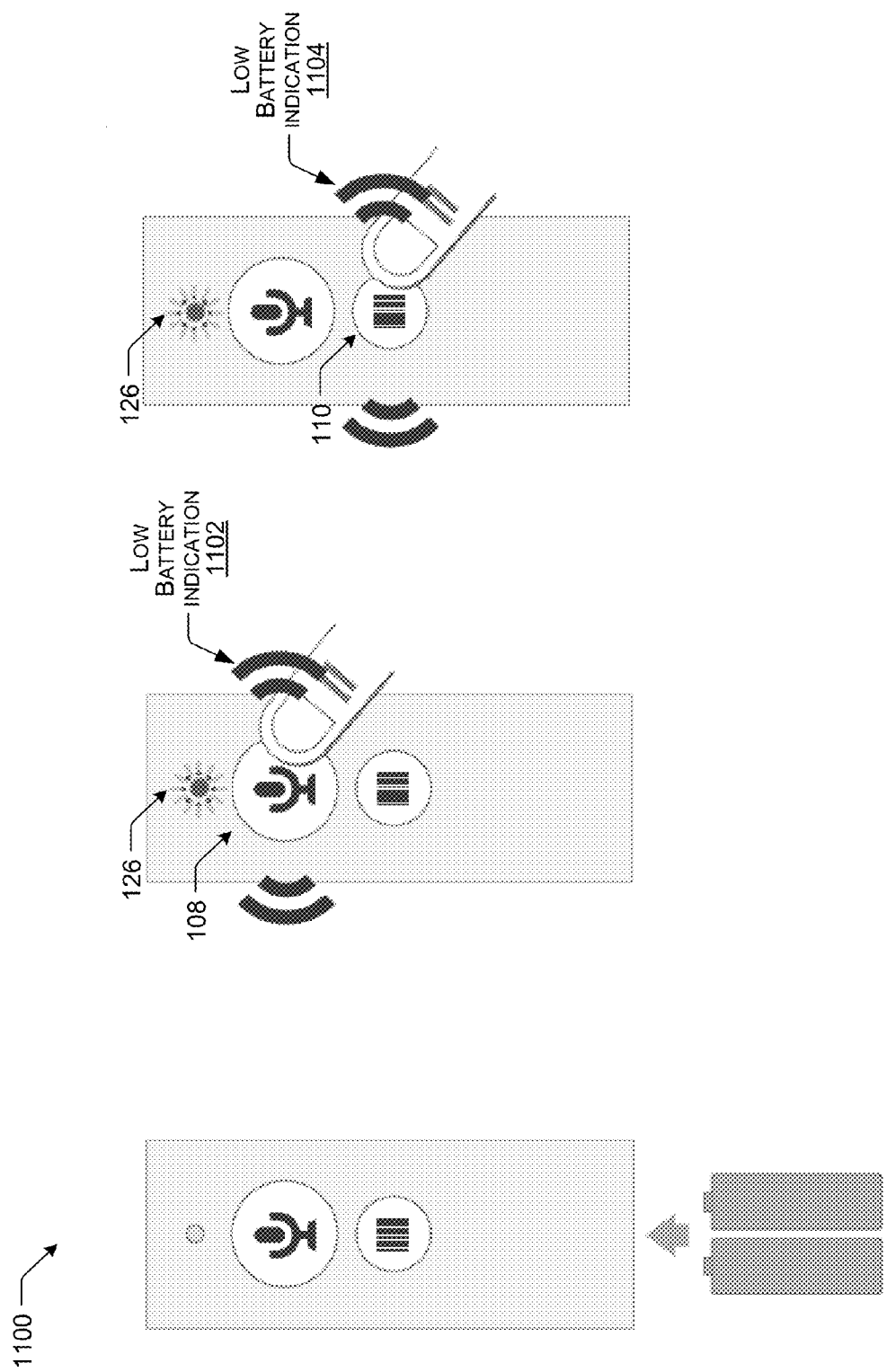

Referring to FIG. 11, an example of feedback provided to the user 502 via the handheld electronic device 102 is illustrated and generally designated 1100. FIG. 11 illustrates that a low battery indication 1102 (e.g., as a flashing red LED 126) may be provided to the user 502 in response to a selection of the first button 108. FIG. 11 further illustrates that a low battery indication 1104 (e.g., as a flashing red LED 126) may be provided to the user 502 in response to a selection of the second button 110.

Figure 12:
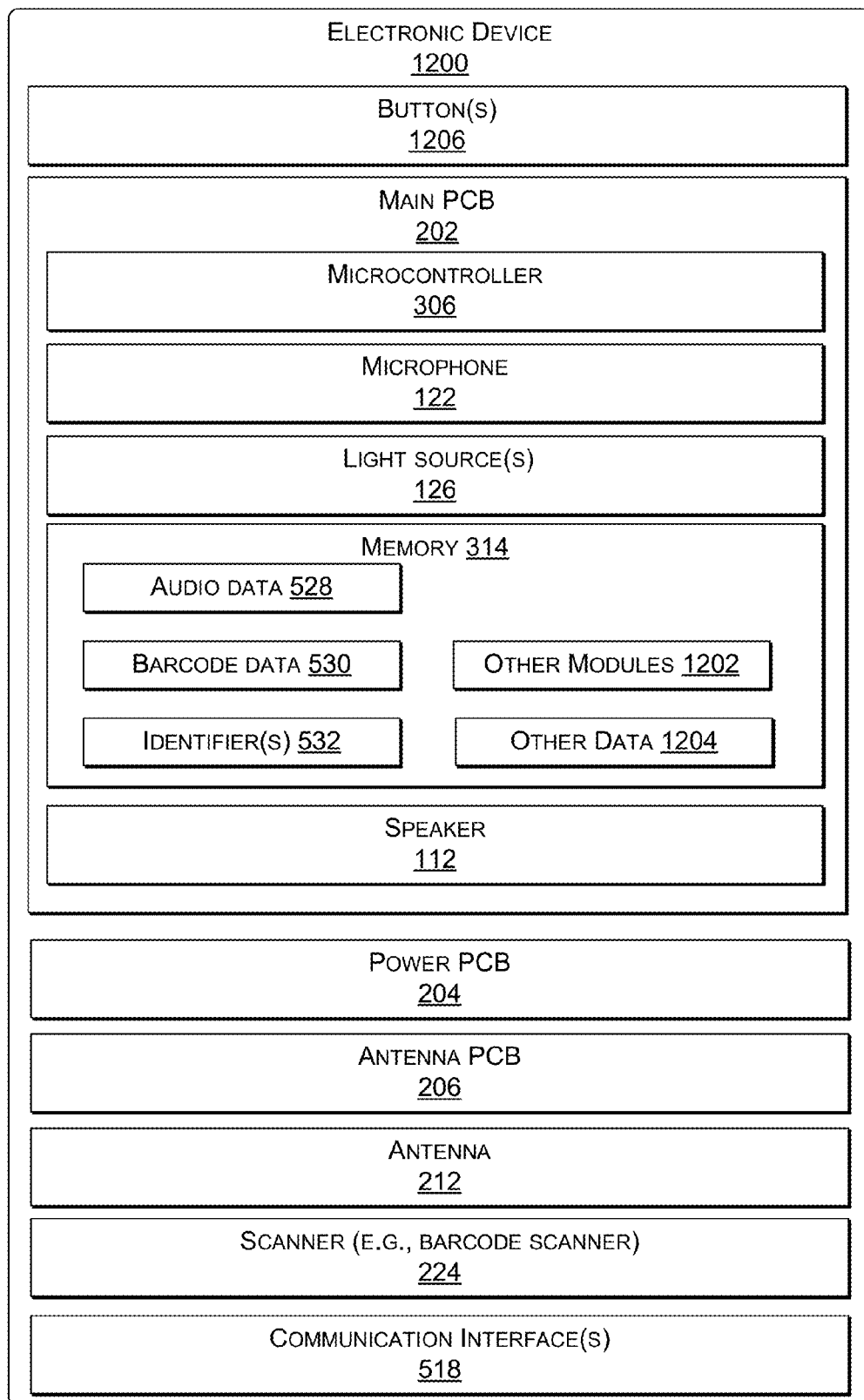
FIG. 12 illustrates select components of an example handheld electronic device, according to some implementations.

FIG. 12 illustrates select example components of an electronic device 1200 that may be used to implement the functionality described above according to some implementations. The electronic device 1200 illustrated in FIG. 12 may correspond to the handheld electronic device 102 of FIGS. 1-11. In a very basic configuration, the electronic device 1200 includes, or accesses, components such at least one processor (e.g., the microcontroller 306 of FIG. 3) and a memory (e.g., the memory 314 of FIG. 3). Each processor may itself comprise one or more processors or cores. The processor(s) can be configured to fetch and execute computer-readable instructions stored in the memory 314 or other computer-readable media. FIG. 12 illustrates that the electronic device 1200 may include the main PCB 202, the power PCB 204, the antenna PCB 206, and the antenna 212, as illustrated and described above with respect to FIGS. 2-4. In the example of FIG. 12, the microcontroller 306 may be disposed on or otherwise communicatively coupled to the main PCB 202. While not illustrated in FIG. 12, one or more other components may be disposed on or otherwise communicatively coupled to the main PCB 202 (see e.g., FIG. 3). Further, while not illustrated in FIG. 12, one or more other components may be disposed on or otherwise communicatively coupled to the power PCB 204 (see e.g., FIG. 2) and/or the antenna PCB 206.

Depending on the configuration of the electronic device 1200, the memory 314 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the microcontroller 306 directly or through another computing device. Accordingly, the memory 314 may be computer-readable media able to maintain instructions, modules or components executable by the microcontroller 306.

The memory 314 may be used to store any number of functional components that are executable by the microcontroller 306. In some implementations, these functional components comprise instructions or programs that are executable by the microcontroller 306 and that, when executed, implement operational logic for performing the actions attributed above to the electronic device 1200. Functional components of the electronic device 1200 stored in the memory 314 may include one or more components for controlling and managing various functions of the electronic device 1200. Depending on the type of the electronic device 1200, the memory 314 may also optionally include other functional components, such as other modules 1202, which may include applications, programs, drivers and so forth.

The memory 314 may also store data, data structures, and the like that are used by the functional components. For example, data stored by the memory 314 may include an SSID associated with the WAP 524, a password associated with the WAP 524, and a token to be provided to a delivery service. Further, data stored in the memory 314 may include the audio data 528 that may represent recording(s) of voice input received from the user 502 when operating in the voice input mode, the barcode data 530 associated with scanned item identifier(s), and identifier(s) 532 such as a customer account identifier and/or a device identifier. The electronic device 1200 may also include other data 1204, which may include, for example, data used by the control logic and the other modules 1202. Further, the electronic device 1200 may include many other logical, programmatic and physical components, of which those described are merely examples that are related to the discussion herein.

While not shown in FIG. 12, in some cases, the electronic device 1200 may include a display, which may be passive, emissive or any other form of display. For example, the display may be an active display such as a liquid crystal display, plasma display, light emitting diode display, organic light emitting diode display, and so forth. Further, while not shown in FIG. 12, in some cases, the electronic device 1200 may also include a camera.

In some embodiments, the one or more communication interfaces 518 may support at least a wireless connection to various networks, such as a WiFi network. Further, in some cases, the one or more communication interfaces 518 may support both wired and wireless connections to various networks, such as cellular networks, radio, WiFi networks, short-range or near-field networks (e.g., Bluetooth®), infrared signals, local area networks, wide area networks, the Internet, and so forth. In some cases, the communication interfaces 518 may further allow a user to access storage on another device, such as a user's computing device, a network attached storage device, or the like.

The electronic device 1200 may further be equipped with various input/output (I/O) components. For example, the control logic of the electronic device 1200 may include suitable drivers configured to accept input from a keypad, keyboard, or other user actuatable controls and devices included as the I/O components. For instance, the user actuatable controls may include one or more buttons 1206. To illustrate, the one or more buttons 1206 may correspond to the first button 108 and the second button 110. Further, the electronic device 1200 may include other I/O components, such as page turning buttons, navigational keys, a power on/off button, selection keys, and so on. Other examples may include a touchscreen and various user actuatable controls (e.g., buttons, a joystick, a keyboard, a mouse, etc.), the speaker 112, the microphone 122, the one or more light sources 126, connection ports, and so forth. Additionally, the electronic device 1200 may include various other components that are not shown, examples of which include removable storage, a power source, such as a battery and power control unit, a global positioning system (GPS) device, a PC Card component, and so forth.

Figure 13:
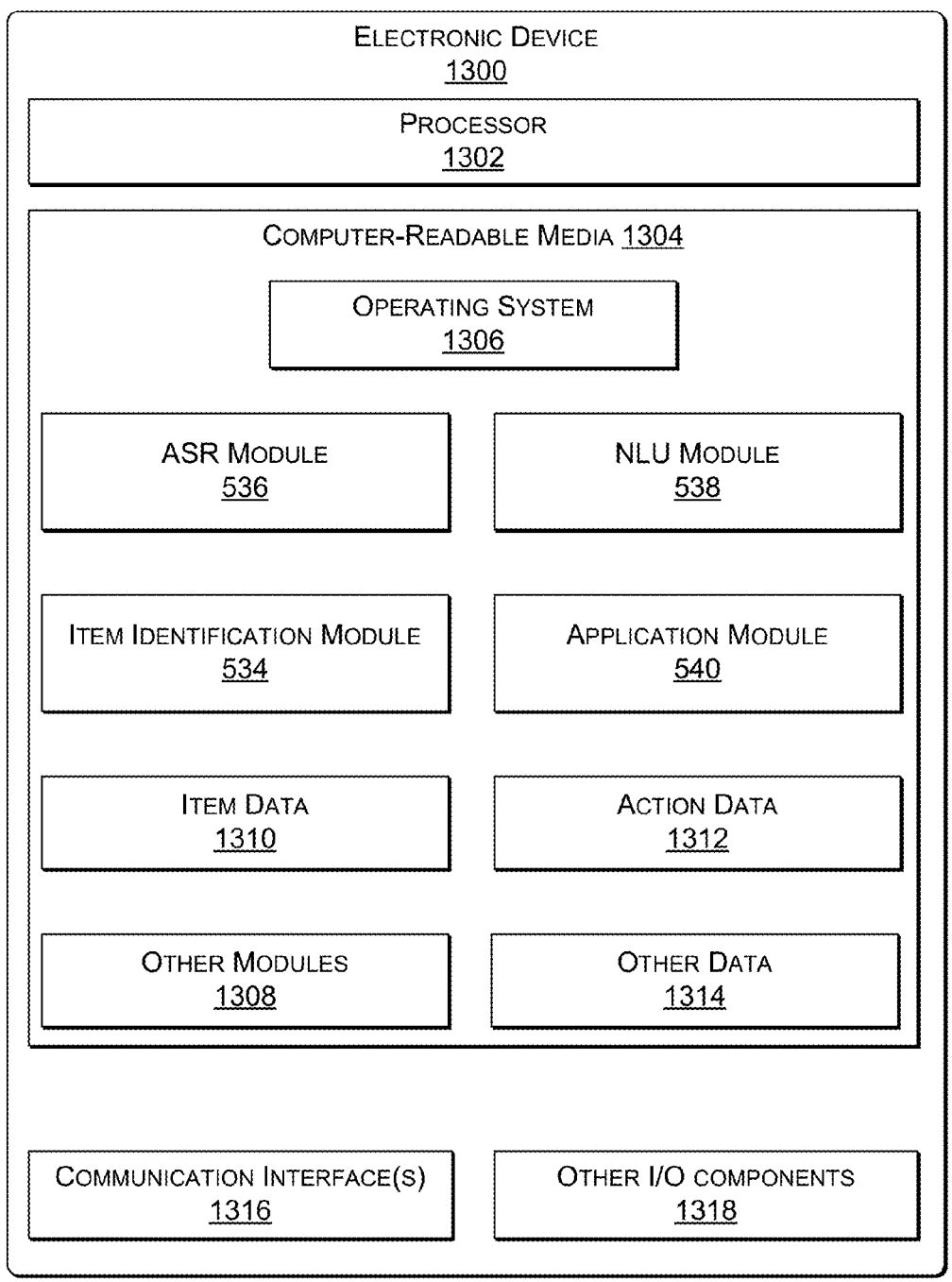
FIG. 13 illustrates select components of an example electronic device (e.g., associated with a delivery service), according to some implementations.

FIG. 13 illustrates select example components of an electronic device 1300 that may be used to implement select portions of the functionality described above, according to some implementations. The electronic device 1300 illustrated in FIG. 13 may correspond to the one or more remote computing devices 520 illustrated in FIG. 5. In a very basic configuration, the electronic device 1300 includes, or accesses, components such as at least one processor 1302 and a computer-readable media 1304. Each processor 1302 may itself comprise one or more processors or cores. The processor(s) 1302 can be configured to fetch and execute computer-readable instructions stored in the computer-readable media 1304 or other computer-readable media.

Depending on the configuration of the electronic device 1300, the computer-readable media 1304 may be an example of non-transitory computer storage media and may include volatile and nonvolatile memory and/or removable and non-removable media implemented in any type of technology for storage of information such as computer-readable instructions, data structures, program modules or other data. Such computer-readable media includes, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processor 1302 directly or through another computing device. Accordingly, the computer-readable media 1304 may be computer-readable media able to maintain instructions, modules or components executable by the processor 1302.

The computer-readable media 1304 may be used to store any number of functional components that are executable by the processor 1302. In some implementations, these functional components comprise instructions or programs that are executable by the processor 1302 and that, when executed, implement operational logic for performing the actions attributed above to the electronic device 1300. Functional components of the electronic device 1300 stored in the computer-readable media 1304 may include the item identification module 534, the ASR module 536, the NLU module 538, and the application module 540, as described above, which may be executed on the processor 1302. Other functional components may include an operating system 1306 for controlling and managing various functions of the electronic device 1300. Depending on the type of the electronic device 1300, the computer-readable media 1304 may also optionally include other functional components, such as other modules 1308, which may include applications, programs, drivers and so forth.

The computer-readable media 1304 may also store data, data structures, and the like that are used by the functional components. For example, data stored by the computer-readable media 1304 may include item data 1310 (e.g., the item database 542 of FIG. 5) accessible to the item identification module 534 and action data 1322 accessible to the application module 540. The electronic device 1300 may also include other data 1314, which may include, for example, data used by the operating system 1306 and the other modules 1308. Further, the electronic device 1300 may include many other logical, programmatic and physical components, of which those described are merely examples that are related to the discussion herein.

One or more communication interfaces 1316 may support both wired and wireless connection to various networks, such as cellular networks, radio, WiFi networks, short-range or near-field networks (e.g., Bluetooth®), infrared signals, local area networks, wide area networks, the Internet, and so forth. The electronic device 1300 may further be equipped with various other input/output (I/O) components 1318. Additionally, the electronic device 1300 may include various other components that are not shown.

Various instructions, methods and techniques described herein may be considered in the general context of computer-executable instructions, such as program modules stored on computer storage media and executed by the processors herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Figure 14:
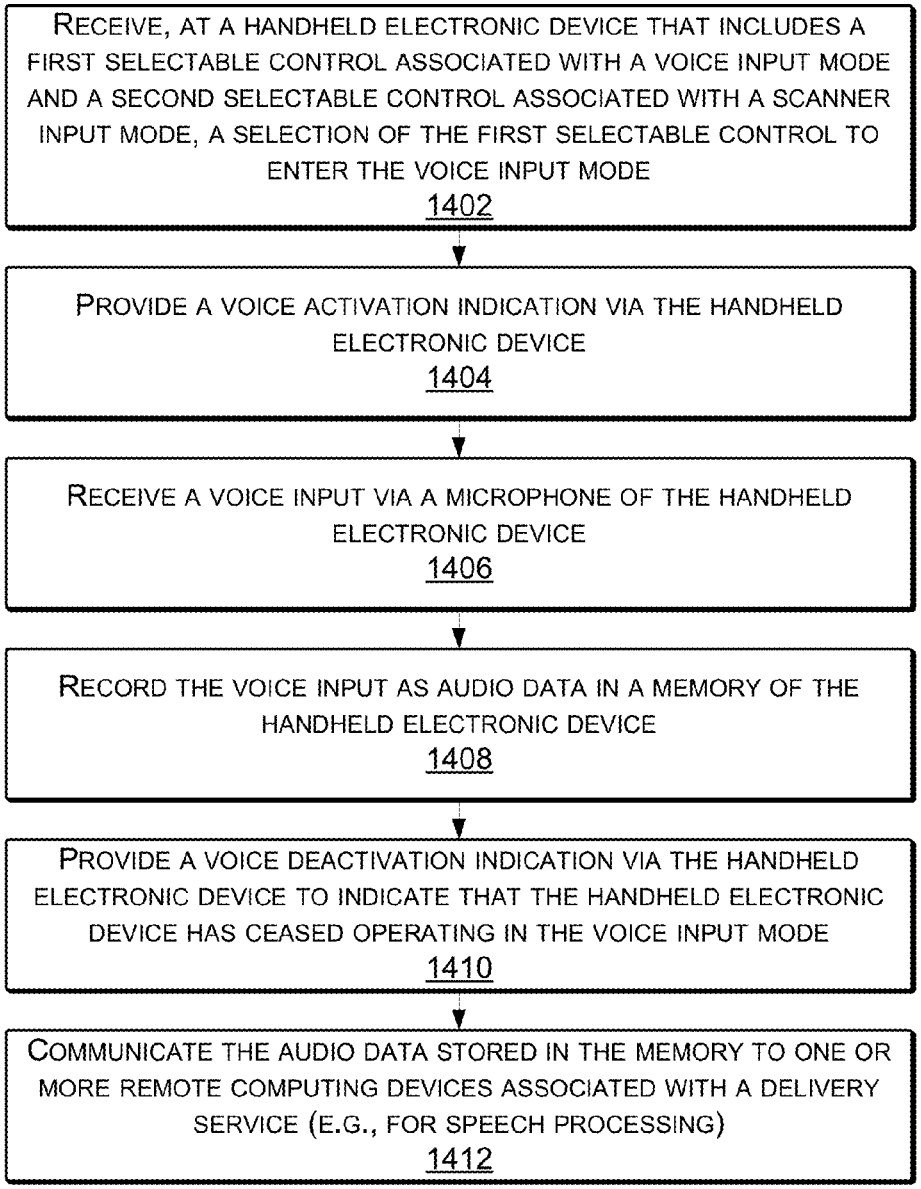
FIG. 14 illustrates an example process for using a handheld device in a voice input mode, according to some implementations.
Figure 15:
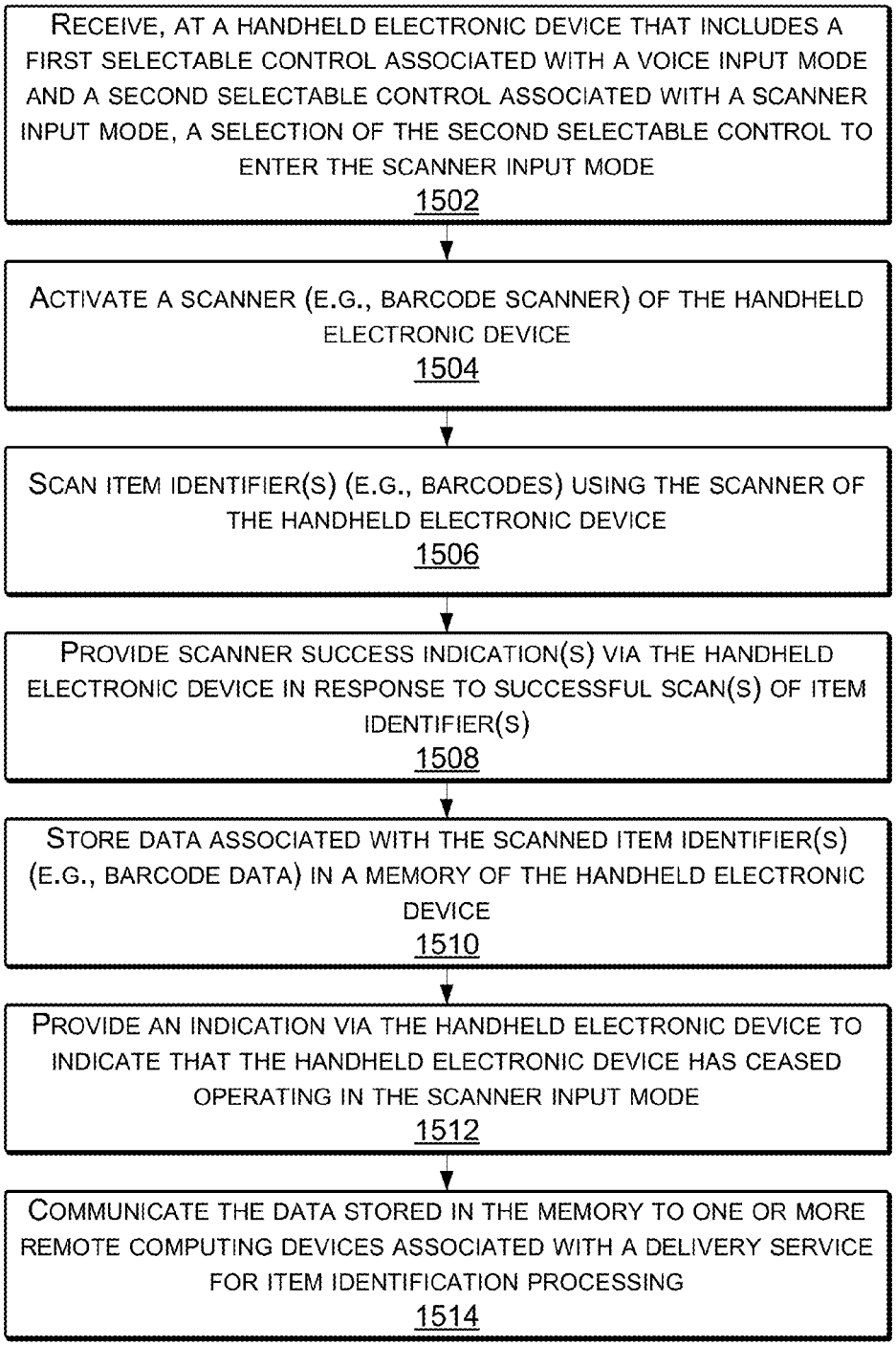
FIG. 15 illustrates an example process for using a handheld electronic device in a scanner input mode, according to some implementations.

FIGS. 14 and 15 illustrate example processes 1400 and 1500 for using a handheld electronic device to provide voice and/or scanner input to a delivery service, as described above. FIGS. 14 and 15 illustrate the processes 1400 and 1500 as a collection of blocks in a logical flow diagram, which represents a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described blocks can be combined in any order and/or in parallel to implement the process, or alternative processes, and not all of the blocks need be executed. For discussion purposes, the processes are described with reference to the architectures and environments described in the examples herein, although the processes may be implemented in a wide variety of other architectures or environments.

FIG. 14 illustrates an example process 1400 for using a handheld device to provide voice input to a delivery service, according to some implementations.

At 1402, the process 1400 includes receiving, at a handheld electronic device that includes a first selectable control associated with a voice input mode and a second selectable control associated with a scanner input mode, a selection of the first selectable control to enter the voice input mode. For example, referring to FIG. 5, the handheld electronic device 102 may include the first selectable control 108 (e.g., a first button identified by a microphone icon) associated with the voice input mode and the second selectable control 110 (e.g., a second button identified by a scanner icon) associated with the scanner input mode. Referring to the example of FIG. 6, the voice activation input 610 includes user actuation of the first button 108 to enter the voice input mode. Referring to FIG. 3, the microcontroller 306 may detect that an underside of the first button 108 has electrically contacted the first selectable control contact 302 of the main PCB 202. In response, the microcontroller 306 may perform one or more operations to enter the voice input mode, including at least the activation of the microphone 122 (in order to record a voice input from the user 502).

In the example illustrated in FIG. 14, the process 1400 further includes providing a voice activation indication via the handheld electronic device, at 1404. The voice activation indication may alert the user 502 that the voice input mode is active and that audio received via the microphone 122 is being recorded and stored to the memory 314. Referring to the example of FIG. 6, in response to the voice activation input 610, the handheld electronic device 102 may enter the voice input mode and may provide a voice activation indication 612 (e.g., a beep generated by the speaker/buzzer 112), prompting the user 502 to speak. Thus, the one or more operations performed by the microcontroller 306 to enter the voice input mode may further include at least the activation of the speaker/buzzer 112 (in order to provide the voice activation indication to the user 502). Alternatively or additionally, the voice activation indication 612 may include activation of one or more of the LEDs 126 or a vibration, among other alternatives. In this case, the one or more operations performed by the microcontroller 306 to enter the voice input mode may further include at least the activation of one or more of the LEDs 126.

At 1406, the process 1400 includes receiving a voice input via a microphone of the handheld electronic device. For example, referring to FIG. 5, the microphone 122 of the handheld electronic device 102 may receive speech from the user 502. At 1408, the process 1400 includes recording the voice input as audio data in a memory of the handheld electronic device. For example, in some cases, the voice input may be stored in the memory 314 as the audio data 530. In some cases, the user 502 may continue to depress the first button 108 until the user 502 has finished speaking. To illustrate, referring to the example of FIG. 8, after receiving the voice activation input 610, the user 502 may continue to depress the first button 108 until the user 502 has finished speaking. The voice input mode may be deactivated in response to detecting that the first button 108 is no longer being depressed by the user 502. To illustrate, referring to FIG. 3, the microcontroller 306 may detect that the underside of the first button 108 is no longer electrically connected to the first selectable control contact 302. In response, the microcontroller 306 may deactivate the microphone 122 to stop recording speech from the user 502.

At 1410, the process 1400 includes providing a voice deactivation indication via the handheld electronic device. To illustrate, in the example of FIG. 8, the voice deactivation indication 802 includes audio (e.g., a beep) that is provided via the speaker 112. The voice deactivation indication 802 may provide feedback to the user 502 to indicate that the microphone 122 is no longer recording the user's speech. The voice deactivation indication 802 may provide privacy protection so that the user 502 knows that her speech is no longer being recorded. Referring to FIG. 3, the microcontroller 306 may detect that the underside of the first button 108 is no longer electrically connected to the first selectable control contact 302. In response, the microcontroller 306 may deactivate the microphone 122 to stop recording speech from the user 502. Alternatively or additionally, the voice deactivation indication may include activation of one or more of the LEDs 126 or a vibration, among other alternatives. In this case, the microcontroller 306 may activate at least one of one or more of the LEDs 126 to provide the voice deactivation indication.

At 1412, the process 1400 includes communicating the audio data stored in the memory to one or more remote computing devices associated with a delivery service, for speech processing. For example, the audio data 528 stored in the memory 314 may be communicated to the one or more remote computing devices 520, for speech processing (e.g., by the ASR module 536 and the NLU module 538).

As indicated above, the order in which the operations are described in the example of FIG. 14 should not be construed as a limitation. Any number of the described blocks can be combined in any order and/or in parallel to implement the process, or alternative processes, and not all of the blocks need be executed. As an illustrative, non-limiting example, at least a portion of the voice input may be recorded and stored as audio data (see e.g., step 1408) at substantially the same time that at least a portion of the audio data may be communicated to the one or more remote computing devices (see e.g., step 1412).

FIG. 15 illustrates an example process 1500 for using a handheld device to provide scanner input to a delivery service, according to some implementations.

At 1502, the process 1500 includes receiving, at a handheld electronic device that includes a first selectable control associated with a voice input mode and a second selectable control associated with a scanner input mode, a selection of the second selectable control to enter the scanner input mode. For example, referring to FIG. 5, the handheld electronic device 102 may include the first selectable control 108 (e.g., a first button identified by a microphone icon) associated with the voice input mode and the second selectable control 110 (e.g., a second button identified by a scanner icon) associated with the scanner input mode. Referring to the example of FIG. 6, the scanner activation input 614 includes user actuation of the second button 110 to enter the scanner input mode. Referring to FIG. 3, the microcontroller 306 may detect that an underside of the second button 110 has electrically contacted the second selectable control contact 304 of the main PCB 202. In response, the microcontroller 306 may perform one or more operations to enter the scanner input mode, including at least the activation of the scanner 224 via the scanner module 316.

At 1504, the process 1500 further includes activating a scanner of the handheld electronic device, at 1504. The activation of the scanner may alert the user 502 that the scanner input mode is active and that the user 502 may scan one or more identifiers (e.g., barcodes) using the scanner. Referring to the example of FIG. 6, in response to the scanner activation input 614, the handheld electronic device 102 may enter the scanner input mode and may activate the red scanner light, as shown at 616. Alternatively or additionally, the handheld electronic device 102 may provide a scanner activation indication (e.g., a beep generated by the speaker/buzzer 112), prompting the user 502 to scan barcode(s). In this case, the one or more operations performed by the microcontroller 306 to enter the scanner input mode may further include at least the activation of the speaker/buzzer 112 (in order to provide the scanner activation indication to the user 502). Alternatively or additionally, the scanner activation indication may include activation of one or more of the LEDs 126 or a vibration, among other alternatives. In this case, the one or more operations performed by the microcontroller 306 to enter the scanner input mode may further include at least the activation of one or more of the LEDs 126.

At 1506, the process 1500 includes scanning one or more item identifier(s) (e.g., one or more barcodes) using the scanner of the handheld electronic device. For example, referring to FIG. 5, the first item 506 may include a scannable barcode 512, and the user 502 may scan the barcode 512 using the scanner 224.

At 1508, the process 1500 includes providing scanner success indication(s) in response to successful scan(s) of item identifier(s). To illustrate, in the example of FIG. 9, the scanner success indication 902 includes audio (e.g., a beep) that may provide feedback to the user 502 to indicate that a particular item identifier (e.g., a barcode) was successfully scanned. In some cases, the scanner success indication 902 may be provided after each successful barcode scan in the event that the user 502 scans multiple barcodes while the second button 110 remains depressed.

In a particular embodiment, in response to a scan of particular item, the associated barcode data 530 may be communicated to the one or more remote computing devices 520. In some cases, substantially real-time information regarding a particular scanned item may be available for communication from the one or more remote computing devices 520 to the handheld electronic device 102 via the network 526. The handheld electronic device 102 may be configured to provide an indication (e.g., audible, visual, haptic, etc.) to the user 502 regarding the particular scanned item. As an illustrative example, the handheld electronic device 102 may provide an indication to alert the user 502 that the particular scanned item is not currently available. Alternatively or additionally, the handheld electronic device 102 may provide an indication (e.g., speech generated by a text-to-speech module) with respect to an expected availability of the particular scanned item.

At 1510, the process 1500 includes storing data associated with the scanned item identifier(s) (e.g., one or more scanned barcodes) in a memory of the handheld electronic device. For example, in some cases, the data may be stored in the memory 314 as scanned data (e.g., the barcode data 530 of FIG. 5). At 1512, the process 1500 includes deactivating the scanner. In some cases, as illustrated in the example of FIG. 9, the user 502 may continue to depress the second button 110 until the user 502 has finished scanning.

The scanner 224 may be deactivated in response to detecting that the second button 110 is no longer being depressed by the user 502. To illustrate, referring to FIG. 3, the microcontroller 306 may detect that the underside of the second button 110 is no longer electrically connected to the second selectable control contact 304. In response, the microcontroller 306 may deactivate the scanner 224 via the scanner module 316.

At 1514, the process 1500 includes communicating the stored data to one or more remote computing devices associated with a delivery service, for item identification processing. For example, the stored barcode data 530 may be communicated to the one or more remote computing devices 520 (e.g., as a text file that may identify a universal product code (UPC) of the scanned first item 506), for item identification processing (e.g., by the item identification module 534).

The one or more remote computing devices 520 may determine an action to be performed based at least in part on the information about the item. For example, referring FIG. 5, the scanner input may be associated with an item to be ordered, and the application module 540 may determine that the action 544 to be performed includes updating a cart of the user 502 (e.g., stored in a cart database 546).

As indicated above, the order in which the operations are described in the example of FIG. 15 should not be construed as a limitation. Any number of the described blocks can be combined in any order and/or in parallel to implement the process, or alternative processes, and not all of the blocks need be executed. As an illustrative, non-limiting example, at least a portion of the data associated with the scanned item identifier(s) may be stored as barcode data (see e.g., step 1510) at substantially the same time that at least a portion of the barcode data may be communicated to the one or more remote computing devices (see e.g., step 1514).

Thus, FIGS. 14 and 15 illustrate that the handheld electronic device 102 may allow the user 502 to both provide voice input for speech processing and scan an item for item identification processing.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed.

What is claimed is:

1. A handheld electronic device comprising:
   a sleeve having a first side opposite a second side, wherein a first dimension of the sleeve is longer than a second dimension of the sleeve and wherein the first dimension of the sleeve is longer than a third dimension of the sleeve;
   a handle positioned at the second side of the sleeve;
   a button assembly disposed in a first surface of the sleeve, the button assembly comprising:
      a first button associated with a voice input mode; and
      a second button associated with a scanner input mode;
   a lens frame that includes one or more lens feet and that is positioned at the first side of the sleeve;
   a handle frame that includes one or more handle feet and that is positioned at the second side of the sleeve,
   wherein the one or more lens feet point in a first direction toward the one or more handle feet, the one or more handle feet point substantially in a second direction, opposite the first direction, toward the one or more lens feet, and the one or more lens feet and the one or more handle feet push the button assembly substantially toward the first surface;
   a memory;
   a microphone configured to receive a voice input;
   a barcode scanner, wherein the barcode scanner points substantially in the direction of the first dimension; and
   a microcontroller configured to:
      activate the microphone in response to a signal received from the first button; and
      activate the barcode scanner in response to a signal received from the second button.

2. The handheld electronic device as recited in claim 1, further comprising:
   an antenna, and
   wherein the microcontroller is further configured to establish a wireless connection and communicate, via the wireless connection, audio data and barcode data to one or more computing devices.

3. The handheld electronic device as recited in claim 1, further comprising a power supply, wherein the power supply is configured to receive power from at least one removable battery.

4. The handheld electronic device as recited in claim 1, further comprising a sleeve frame configured to secure the barcode scanner and one or more printed circuit boards within the sleeve.

5. A handheld electronic device comprising:
   a housing including a first side opposite a second side;
   a microphone;
   an optical device;
   an antenna;
   a first button;
   a second button;
   one or more lens feet and that are positioned at the first side of the housing;
   one or more handle feet and that are positioned at the second side of the housing,
   wherein the one or more lens feet point in a first direction toward the one or more handle feet, the one or more handle feet point substantially in a second direction, opposite the first direction, toward the one or more lens feet, and the one or more lens feet and the one or more handle feet push the first button and the second button substantially toward a surface of the housing;
   one or more processors; and
   one or more computer-readable media storing instructions that, when executed by the one or more processors, cause the one or more processors to perform operations comprising:
      receiving a first signal based at least in part on a first selection of the first button associated with a first input mode;
      based at least in part on receiving the first signal, receiving a voice input by the microphone;
      generating audio data representing the voice input;
      storing the audio data;
      receiving a second signal based at least in part on a second selection of the second button associated with a second input mode;
      based at least in part on receiving the second signal, receiving an identifier using the optical device;
      storing identifier data representing the identifier;
      establishing a wireless connection using the antenna; and based at least in part on establishing the wireless connection, sending the audio data and the identifier data to the one or more remote computing devices.

6. The handheld electronic device as recited in claim 5, wherein the optical device is a scanner, and wherein receiving the identifier comprises capturing the identifier using the scanner.

7. The handheld electronic device as recited in claim 5, the operations further comprising:
   operating in a first power state;
   operating in a second power state based at least in part on receiving the first signal;
   after storing the audio data, operating in the first power state; and
   operating in a third power state based at least in part on receiving the second signal.

8. The handheld electronic device as recited in claim 5, wherein the first input mode is a voice input mode and the second input mode is a scan input mode, and wherein the operations further comprising:
   activating the microphone based at least in part on the first selection of the first button; and
   activating the optical device based at least in part on the second selection of the second button.

9. An electronic device comprising:
   a housing having a first side opposite a second side;
   a microphone;
   an optical device;
   a first button;
   a second button;
   one or more first feet and that are positioned at the first side of the housing;
   one or more second feet and that are positioned at the second side of the housing,
   wherein the one or more first feet point in a first direction toward the one or more second feet, the one or more second feet point substantially in a second direction, opposite the first direction, toward the one or more first feet, and the one or more first feet and the one or more second feet push the first button and the second button substantially toward a surface of the housing;
   one or more processors; and
   one or more non-transitory computer-readable media storing instructions that, when executed by the one or more processors, cause the one or more processors to perform operations comprising:
      receiving a first selection of the first button associated with a first input mode;
      based at least in part on receiving the first selection of the first button:
         transitioning from a first power state to a second power state, wherein the electronic device consumes more power in the second power state than the first power state;
         receiving a voice input by the microphone;
         storing audio data representing the voice input; and
         sending the audio data to one or more remote computing devices;
      transitioning from the second power state to the first power state;
      receiving a second selection of the second button associated with a second input mode;
      based at least in part on receiving the second selection of the second button, receiving an identifier using the optical device; and
      storing identifier data representing the identifier.

10. The electronic device as recited in claim 9, wherein the first power state is an electrically off state.

11. The electronic device as recited in claim 9, the operations further comprising detecting that the first button is no longer being selected, wherein transitioning from the second power state to the first power state is based at least in part on determining that the first button is no longer being selected.

12. The electronic device as recited in claim 9, the operations further comprising:
   receiving a third selection of the first button; and
   transitioning from the first power state to the second power state.

13. The electronic device as recited in claim 9, the operations further comprising:
   establishing a network connection based at least in part on receiving the first selection of the first button; and
   wherein sending the audio data to the one or more remote computing devices is further based at least in part on establishing the network connection.

14. The electronic device as recited in claim 9, the operations further comprising sending at least a portion of the audio data to the one or more remote computing devices before the voice input is complete.

15. The electronic device as recited in claim 9, the operations further comprising:
   providing a voice activation indication;
   determining that the first button is no longer selected; and
   providing a voice deactivation indication,
   wherein at least one of the voice activation indication or the voice deactivation indication includes at least one of an audible output, a visual output, or a haptic output.

16. The electronic device as recited in claim 9, the operations further comprising:
   determining that no wireless connection has been established; and
   establishing a wireless connection;
   wherein sending the audio data to the one or more remote computing devices is further based at least in part on establishing the wireless connection.

17. The electronic device as recited in claim 16, wherein transitioning from the second power state to the first power state is based at least in part on an expiration of a period of time.

18. The electronic device as recited in claim 9, wherein the first input mode is a voice input mode and the second input mode is a scan input mode, and wherein the operations further comprising:
   activating the microphone based at least in part on receiving the first selection of the first button; and
   activating the optical device based at least in part on receiving the second selection of the second button.

19. The electronic device as recited in claim 9, the operations further comprising:
   transitioning from the first power state to a third power state is based at least in part on receiving the second selection of the second button.

20. The electronic device as recited in claim 9, the operations further comprising:
   activating the microphone based at least in part on receiving the first selection of the first button.

21. A handheld electronic device comprising:
   a housing having a first side opposite a second side;
   an optical device;
   a first button;
   a second button;

one or more first feet and that are positioned at the first side of the housing;

one or more second feet and that are positioned at the second side of the housing, wherein the one or more first feet point in a first direction toward the one or more second feet, the one or more second feet point substantially in a second direction, opposite the first direction, toward the one or more first feet, and the one or more first feet and the one or more second feet push the first button and the second button substantially toward a surface of the housing;

one or more processors; and one or more non-transitory computer-readable media storing instructions that, when executed by the one or more processors, cause the one or more processors to perform operations comprising:

receiving a first selection of the first button associated with a first input mode;

based at least in part on receiving the first selection of the first button:

transitioning the handheld electronic device from a first power state to a second power state, wherein the handheld electronic device consumes more power in the second power state than the first power state;

receiving an item identifier using the optical device of the handheld electronic device;

storing information associated with the item identifier as identifier data in a memory of the handheld electronic device; and sending the identifier data to one or more remote computing devices;

transitioning the handheld electronic device from the second power state to the first power state;

receiving a second selection of a second button associated with a voice input mode;

based at least in part on receiving the second selection of the second button, generating audio data representing a voice input; and storing the audio data in the memory.

22. The handheld electronic device as recited in claim 21, wherein transitioning from the second power state to the first power state comprises transitioning the handheld electronic device from the second power state to an electrically off state.

23. The handheld electronic device as recited in claim 21, wherein the operations further comprise providing an indication via the handheld electronic device based at least in part on receiving the item identifier.

24. The handheld electronic device as recited in claim 21, wherein the operations further comprise:

establishing a network connection; and wherein sending the identifier data is further based at least in part on establishing the network connection.

25. The handheld electronic device as recited in claim 21, wherein the operations further comprise:

transitioning the handheld electronic device from the first power state to a third power state, wherein the handheld electronic device consumes more power in the third power state than the first power state; and receiving, at the handheld electronic device, the voice input using a microphone of the handheld electronic device.

26. The handheld electronic device as recited in claim 21, wherein the operations further comprise:

determining that no wireless connection has been established; and establishing the wireless connection based at least in part on the first selection of the first button, wherein sending the identifier data is further based at least in part on establishing the wireless connection.

27. The handheld electronic device as recited in claim 21, wherein the operations further comprise:

transitioning from the first power state to a third power state is based at least in part on receiving the second selection of the second button.

* * * * *